US011098921B2

(12) United States Patent
Ellis et al.

(10) Patent No.: US 11,098,921 B2
(45) Date of Patent: Aug. 24, 2021

(54) BUILDING MANAGEMENT SYSTEM WITH AUTOMATIC COMFORT CONSTRAINT ADJUSTMENT

(71) Applicant: Johnson Controls Technology Company, Auburn Hills, MI (US)

(72) Inventors: Matthew J. Ellis, Milwaukee, WI (US); John H. Burroughs, Wauwatosa, WI (US); Juan Esteban Tapiero Bernal, Wauwatosa, WI (US); Anas W. I. Alanqar, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 206 days.

(21) Appl. No.: 16/516,076

(22) Filed: Jul. 18, 2019

(65) Prior Publication Data

US 2021/0018211 A1    Jan. 21, 2021

(51) Int. Cl.
*F24F 11/00*    (2018.01)
*F24F 11/72*    (2018.01)
(Continued)

(52) U.S. Cl.
CPC .......... *F24F 11/72* (2018.01); *G05D 23/1904* (2013.01); *F24F 2120/10* (2018.01); *F24F 2130/00* (2018.01); *G05D 23/32* (2013.01)

(58) Field of Classification Search
CPC .... F24F 11/72; F24F 2120/10; F24F 2130/00; G05D 23/1904; G05D 23/32
(Continued)

(56) References Cited

U.S. PATENT DOCUMENTS 7,580,775 B2 *    8/2009    Kulyk ................... H02J 3/144
                                              700/296
7,584,897 B2 *    9/2009    Schultz .................. F24F 11/30
                                              236/1 C
(Continued)

OTHER PUBLICATIONS

Ward et al., "Beyond Comfort—Managing the Impact of HVAC Control on the Outside World," Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008, 15 pages.

*Primary Examiner* — Claire E Rojohn, III
(74) *Attorney, Agent, or Firm* — Foley & Lardner LLP

(57) ABSTRACT

An HVAC system for automatically adjusting setpoint boundaries of a space includes building equipment configured to provide heating or cooling to the space to affect an environmental condition of the space and a controller. The controller obtains occupant setpoint adjustment data indicating occupant setpoint increases or occupant setpoint decreases at multiple times during a time interval and partitions the occupant setpoint adjustment data into time period bins based on the multiple times associated with the occupant setpoint adjustment data, each of the time period bins containing occupant setpoint adjustment data characterized by a common time attribute. The controller determines a number of occupant setpoint increases and a number of occupant setpoint decreases indicated by the occupant setpoint adjustment data within each time period bin and adjusts a setpoint boundary of the space based on the number of occupant setpoint increases or the number of occupant setpoint decreases.

20 Claims, 15 Drawing Sheets

(51) Int. Cl.
  *G05D 23/19* (2006.01)
  *F24F 120/10* (2018.01)
  *F24F 130/00* (2018.01)
  *G05D 23/32* (2006.01)

(58) Field of Classification Search
  USPC .................................................... 165/237
  See application file for complete search history.

(56) References Cited

U.S. PATENT DOCUMENTS

| | | | | |
|---|---|---|---|---|
| 7,861,941 | B2* | 1/2011 | Schultz | G05D 23/1904 236/1 C |
| 7,894,946 | B2 | 2/2011 | Kulyk et al. | |
| 8,527,108 | B2* | 9/2013 | Kulyk | H02J 3/14 700/295 |
| 8,527,109 | B2* | 9/2013 | Kulyk | H02J 3/14 700/296 |
| 8,918,223 | B2 | 12/2014 | Kulyk et al. | |
| 9,110,647 | B2 | 8/2015 | Kulyk et al. | |
| 9,429,923 | B2* | 8/2016 | Ward | G05B 15/02 |
| 9,551,501 | B2* | 1/2017 | Schnell | F24F 11/30 |
| 9,606,520 | B2 | 3/2017 | Noboa et al. | |
| 9,703,339 | B2 | 7/2017 | Kulyk et al. | |
| 9,890,971 | B2* | 2/2018 | Ribbich | G05D 23/1902 |
| 10,133,283 | B2* | 11/2018 | Bergman | H04W 64/00 |
| 10,139,877 | B2 | 11/2018 | Kulyk et al. | |
| 10,162,327 | B2* | 12/2018 | Sinha | G07F 17/0057 |
| 10,546,472 | B2* | 1/2020 | Alberth, Jr. | G01C 21/00 |
| 10,655,881 | B2* | 5/2020 | Sinha | G08B 21/10 |
| 10,684,598 | B1 | 6/2020 | Alanqar | G05B 23/0235 |
| 10,712,038 | B2* | 7/2020 | Ribbich | F24F 11/523 |
| 10,761,547 | B2* | 9/2020 | Risbeck | G05B 15/02 |
| 10,761,704 | B2* | 9/2020 | Moore | F24F 11/30 |
| 10,802,459 | B2* | 10/2020 | Frenz | F24F 11/30 |
| 10,802,513 | B1* | 10/2020 | Rados | H05B 1/0275 |
| 10,866,007 | B2* | 12/2020 | Paddock | F24F 11/46 |
| 10,876,754 | B2* | 12/2020 | Wenzel | G06Q 10/06 |
| 10,915,094 | B2* | 2/2021 | Wenzel | G06N 20/00 |
| 10,941,951 | B2* | 3/2021 | Hern | F24F 1/08 |
| 10,948,214 | B2* | 3/2021 | Ray | F24F 11/67 |
| 10,952,297 | B2* | 3/2021 | Eisele | H05B 45/46 |
| 10,955,800 | B2* | 3/2021 | Burroughs | H04L 12/2827 |
| 2001/0029585 | A1* | 10/2001 | Simon | G08B 25/008 726/4 |
| 2002/0162032 | A1* | 10/2002 | Gundersen | H02J 13/0086 713/300 |
| 2002/0173929 | A1* | 11/2002 | Seigel | F24F 11/30 702/130 |
| 2003/0000692 | A1* | 1/2003 | Okano | F24F 11/30 165/238 |
| 2003/0014179 | A1* | 1/2003 | Szukala | G01M 15/02 701/114 |
| 2003/0034897 | A1* | 2/2003 | Shamoon | G05D 23/1905 340/12.22 |
| 2003/0034898 | A1* | 2/2003 | Shamoon | G05D 23/1905 340/12.22 |
| 2003/0074489 | A1* | 4/2003 | Steger | G01D 9/005 710/1 |
| 2003/0114942 | A1* | 6/2003 | Varone | G05B 19/042 700/83 |
| 2003/0121652 | A1* | 7/2003 | Carey | G05D 23/1904 165/238 |
| 2003/0123224 | A1* | 7/2003 | LaCroix | B60R 16/0239 361/688 |
| 2003/0136135 | A1* | 7/2003 | Kim | F25D 29/00 62/125 |
| 2003/0142121 | A1* | 7/2003 | Rosen | G05D 23/1904 715/702 |
| 2003/0150926 | A1* | 8/2003 | Rosen | G05D 23/1905 236/51 |
| 2003/0150927 | A1* | 8/2003 | Rosen | F24F 11/30 236/51 |
| 2004/0074978 | A1* | 4/2004 | Rosen | G05D 23/1904 236/1 C |
| 2004/0245352 | A1* | 12/2004 | Smith | G05D 23/1904 236/94 |
| 2005/0055432 | A1* | 3/2005 | Rodgers | G01D 4/004 709/223 |
| 2005/0156052 | A1* | 7/2005 | Bartlett | F24F 11/0001 236/49.3 |
| 2005/0192713 | A1* | 9/2005 | Weik | G06Q 50/188 700/295 |
| 2009/0216387 | A1* | 8/2009 | Klein | H02J 3/381 700/296 |
| 2010/0070103 | A1* | 3/2010 | Fleck | H02J 3/14 700/296 |
| 2012/0022700 | A1* | 1/2012 | Drees | G06Q 30/0283 700/276 |
| 2012/0259583 | A1* | 10/2012 | Noboa | H02J 13/0062 702/179 |
| 2014/0207281 | A1* | 7/2014 | Angle | H04L 12/282 700/257 |
| 2014/0207282 | A1* | 7/2014 | Angle | G05B 15/02 700/257 |
| 2017/0192400 | A1* | 7/2017 | Hofschulz | H04W 4/70 |
| 2018/0004171 | A1* | 1/2018 | Patel | F24F 11/62 |
| 2018/0004172 | A1* | 1/2018 | Patel | F24F 5/0017 |
| 2018/0180314 | A1* | 6/2018 | Brisette | G05B 23/0281 |
| 2018/0191197 | A1* | 7/2018 | Carr | G01R 11/56 |
| 2018/0260101 | A1* | 9/2018 | Przybylski | G06F 8/45 |
| 2018/0285800 | A1 | 10/2018 | Wenzel et al. | |
| 2018/0314220 | A1* | 11/2018 | Kumar | G06Q 30/0283 |
| 2019/0079473 | A1* | 3/2019 | Kumar | G06Q 10/06315 |
| 2019/0086528 | A1* | 3/2019 | Steiner | F04D 29/661 |
| 2019/0178523 | A1* | 6/2019 | Zimmerman | F24F 11/523 |
| 2019/0219293 | A1* | 7/2019 | Wenzel | G06Q 30/0283 |
| 2019/0257544 | A1* | 8/2019 | Alanqar | F24F 11/63 |
| 2019/0286114 | A1* | 9/2019 | Przybylski | G06Q 50/06 |
| 2019/0316802 | A1* | 10/2019 | Alanqar | G05B 13/048 |
| 2019/0338974 | A1* | 11/2019 | Turney | F24F 11/64 |
| 2020/0025402 | A1* | 1/2020 | Bell | G05D 23/1904 |
| 2020/0218991 | A1* | 7/2020 | Alanqar | G06N 5/04 |
| 2020/0241491 | A1* | 7/2020 | Przybylski | G06Q 50/06 |
| 2021/0018206 | A1* | 1/2021 | Barooah | G05B 13/048 |
| 2021/0018211 | A1* | 1/2021 | Ellis | G05D 23/1904 |
| 2021/0025610 | A1* | 1/2021 | Brahme | F24F 11/38 |

* cited by examiner

BUILDING MANAGEMENT SYSTEM WITH AUTOMATIC COMFORT CONSTRAINT ADJUSTMENT

BACKGROUND

The present disclosure relates generally to control systems for an HVAC system. More particularly, the present disclosure relates to maintaining occupant comfort in a zone, building, room, or space. Different occupants can have different comfort preferences. Additionally, when occupancy of a room changes, weather conditions change, seasons change, etc., the occupant's comfort preferences can also change.

SUMMARY

One implementation of the present disclosure is an HVAC system for automatically adjusting setpoint boundaries of a space, according to some embodiments. In some embodiments, the system includes building equipment configured to provide heating or cooling to the space to affect an environmental condition of the space. In some embodiments, the system includes a setpoint adjustment controller configured to obtain occupant setpoint adjustment data indicating occupant setpoint increases or occupant setpoint decreases at multiple times during a time interval. In some embodiments, the setpoint adjustment controller is configured to partition the occupant setpoint adjustment data into time period bins based on the multiple times associated with the occupant setpoint adjustment data, each of the time period bins containing occupant setpoint adjustment data characterized by a common time attribute. In some embodiments, the setpoint adjustment controller is configured to determine a number of occupant setpoint increases and a number of occupant setpoint decreases indicated by the occupant setpoint adjustment data within each time period bin. In some embodiments, the setpoint adjustment controller is configured to adjust a setpoint boundary of the space based on the number of occupant setpoint increases or the number of occupant setpoint decreases.

In some embodiments, each of the time period bins corresponds to a particular day type and a particular daily time period. In some embodiments, the controller is configured to adjust a setpoint boundary of a particular day type and a particular daily time period based on the number of occupant setpoint increases and occupant setpoint decreases indicated by the occupant setpoint adjustment data within the corresponding time period bin.

In some embodiments, the controller is configured to increase the setpoint boundary of the space for one or more time periods associated with a particular time period bin in response to the number of setpoint increases indicated by the occupant setpoint adjustment data within the particular time period bin exceeding a predetermined threshold value. In some embodiments, the controller is configured to decrease the setpoint boundary of the space for one or more time periods associated with a particular time period bin in response to the number of setpoint decreases indicated by the occupant setpoint adjustment data within the particular time period bin exceeding the predetermined threshold value.

In some embodiments, the controller is configured to maintain a current setpoint boundary for one or more time periods associated with a particular time period bin in response to the number of setpoint decreases indicated by the occupant setpoint adjustment data within the particular time period bin being equal to the number of setpoint increases indicated by the occupant setpoint adjustment data within the particular time period bin. In some embodiments, the controller is configured to maintain a current setpoint boundary for one or more time periods associated with a particular time period bin in response to both (1) the number of setpoint decreases indicated by the occupant setpoint adjustment data within the particular time period bin being less than a first threshold value and (2) the number of setpoint increases indicated by the occupant setpoint adjustment data within the particular time period bin being less than a second threshold value.

In some embodiments, the controller is configured to increase or decrease the setpoint boundary of the space a predetermined amount to adjust the setpoint boundary.

In some embodiments, the controller is configured to independently adjust a minimum allowable setpoint boundary of the space and a maximum allowable setpoint boundary of the setpoint boundary of the space based on the number of setpoint increases and the number of setpoint decreases indicated by the occupant setpoint adjustment data.

In some embodiments, the controller is configured to determine if the occupant setpoint adjustment data does not indicate occupant discomfort and remove occupant setpoint adjustment data that does not indicate occupant discomfort to generate filtered occupant setpoint adjustment data. In some embodiments, if the building equipment is in a cooling mode, the controller determines if the occupant setpoint adjustment data does not indicate occupant discomfort by determining if a zone temperature at an occupant setpoint adjustment time exceeds a model predictive setpoint at the occupant setpoint adjustment time by at least a first predetermined amount, determining if the model predictive setpoint at the occupant setpoint adjustment time exceeds a setpoint at the occupant setpoint adjustment time, and determining that the occupant setpoint adjustment data does not indicate occupant discomfort in response to both (1) the zone temperature exceeding the model predictive setpoint by at least the first predetermined amount and (2) the model predictive setpoint exceeding the setpoint at the occupant setpoint adjustment time. In some embodiments, if the building equipment is in a heating mode, the controller determines if the occupant setpoint adjustment data does not indicate occupant discomfort by determining if the zone temperature at the occupant setpoint adjustment time is less than the model predictive setpoint at the occupant setpoint adjustment time by at least a second predetermined amount, determining if the model predictive setpoint at the occupant setpoint adjustment time is less than the setpoint at the occupant setpoint adjustment time, and determining that the occupant setpoint adjustment data does not indicate occupant discomfort in response to both (1) the zone temperature being less than the model predictive setpoint by at least the second predetermined amount and (2) the model predictive setpoint being less than the setpoint at the occupant setpoint adjustment time.

Another implementation of the present disclosure is a method for adjusting temperature setpoint boundaries to maintain occupant comfort, according to some embodiments. In some embodiments, the method includes obtaining occupant setpoint adjustment data indicating occupant setpoint increases or occupant setpoint decreases at multiple times during a time interval. In some embodiments, the method includes partitioning the occupant setpoint adjustment data into time period bins based on the multiple times associated with the occupant setpoint adjustment data. In some embodiments, each of the time period bins contain occupant setpoint adjustment data characterized by a common time attribute. In some embodiments, the method includes counting a number of occupant setpoint increases and a number of occupant setpoint decreases for each time period bin. In some embodiments, the method includes determining if the number of occupant setpoint increases exceeds a first threshold value and if the number of occupant setpoint decreases exceeds a second threshold value for each time period bin. In some embodiments, the method includes adjusting a setpoint boundary of one or more time period bins based on if the number of occupant setpoint increases exceeds the first threshold value or if the number of occupant setpoint decreases exceeds the second threshold value.

In some embodiments, partitioning the occupant setpoint adjustment data includes partitioning the occupant setpoint adjustment data by day type and into multiple time period bins for each day type.

In some embodiments, the method includes operating building equipment to affect an environmental condition of a space based on the adjusted setpoint boundary.

In some embodiments, the method includes increasing the setpoint boundary in response to the number of occupant setpoint increases exceeding a first threshold value. In some embodiments, the method includes decreasing the setpoint boundary in response to the number of occupant setpoint decreases exceeding a second threshold value. In some embodiments, the method includes maintaining a current setpoint boundary in response to the number of occupant setpoint increases being equal to the number of setpoint increases or both (1) the number of occupant setpoint increases being less than the first threshold value, and (2) the number of setpoint decreases being less than the second threshold value.

In some embodiments, the method includes increasing the setpoint boundary in response to the number of occupant setpoint increases exceeding the first threshold value, the number of occupant setpoint decreases exceeding the second threshold value, and the number of occupant setpoint increases exceeding the number of occupant setpoint decreases. In some embodiments, the method includes decreasing the setpoint boundary in response to the number of occupant setpoint increases exceeding the first threshold value, the number of occupant setpoint decreases exceeding the second threshold value, and the number of occupant setpoint decreases exceeding the number of occupant setpoint increases.

In some embodiments, increasing the setpoint boundary includes increasing a minimum boundary and a maximum boundary by a predetermined offset amount. In some embodiments, decreasing the setpoint boundary includes decreasing the minimum boundary and the maximum boundary by a predetermined offset amount.

Another implementation of the present disclosure is a method for adjusting a temperature setpoint boundary to maintain occupant comfort, according to some embodiments. In some embodiments, the method includes obtaining occupant setpoint data for a time duration and partitioning the occupant setpoint data into multiple time period bins based on multiple times associated with the occupant setpoint data. In some embodiments, each of the time period bins contains occupant setpoint data characterized by a common time attribute. In some embodiments, the method includes counting a number of occupant setpoint increases and a number of occupant setpoint decreases for each of the multiple time period bins. In some embodiments, the method includes determining if the number of occupant setpoint increases or the number of occupant setpoint decreases exceed a threshold value for each of the multiple time period bins. In some embodiments, the method includes adjusting a minimum and maximum threshold of the temperature setpoint boundary for each of the multiple time period bins that the number of occupant setpoint increases or the number of occupant setpoint decreases exceed the threshold value.

In some embodiments, the method includes increasing one of the minimum and the maximum thresholds for each of the time period bins that the number of occupant setpoint increases exceeds the threshold value. In some embodiments, the method includes decreasing one of the minimum and the maximum thresholds for each of the time period bins that the number of occupant setpoint decreases exceeds the threshold value.

In some embodiments, the method includes adjusting the minimum and maximum thresholds of all time period bins associated with a particular one of the time period bins in response to the number of occupant setpoint increases or occupant setpoint decreases exceeding the threshold value for the particular one of the time period bins.

In some embodiments, the method includes receiving a minimum model predictive setpoint boundary and a maximum model predictive setpoint boundary. In some embodiments, the method includes determining if the minimum threshold exceeds the minimum model predictive setpoint boundary and determining if the maximum threshold is less than the maximum model predictive setpoint boundary, for each of the time period bins. In some embodiments, the method includes increasing the minimum model predictive setpoint boundary to be equal to the minimum threshold and increasing the maximum model predictive setpoint boundary to be equal to a smaller of (1) the maximum model predictive setpoint boundary plus an amount the minimum model predictive setpoint boundary is increased by to equal the minimum threshold, or (2) the maximum threshold in response to the minimum threshold exceeding the minimum model predictive setpoint boundary. In some embodiments, the method includes decreasing the maximum model predictive setpoint boundary to be equal to be equal to the maximum threshold and decreasing the minimum model predictive setpoint boundary to be equal to a larger of (1) the minimum model predictive setpoint boundary plus an amount the gmaximum model predictive setpoint boundary is decreased by to equal the maximum threshold, or (2) the minimum threshold in response to the maximum threshold being less than the minimum model predictive setpoint boundary.

In some embodiments, the method includes maintaining current values of the minimum and maximum thresholds and current values of the minimum and maximum model predictive setpoint boundaries in response to both (1) the minimum threshold being less than the minimum model predictive setpoint boundary and (2) the maximum threshold being greater than the maximum model predictive setpoint boundary.

In some embodiments, the method includes operating building equipment based on the temperature setpoint boundary to affect an environmental condition of a space.

In some embodiments, the method includes removing occupant setpoint adjustments that do not indicate occupant discomfort.

DETAILED DESCRIPTION

Overview

Figure 1:
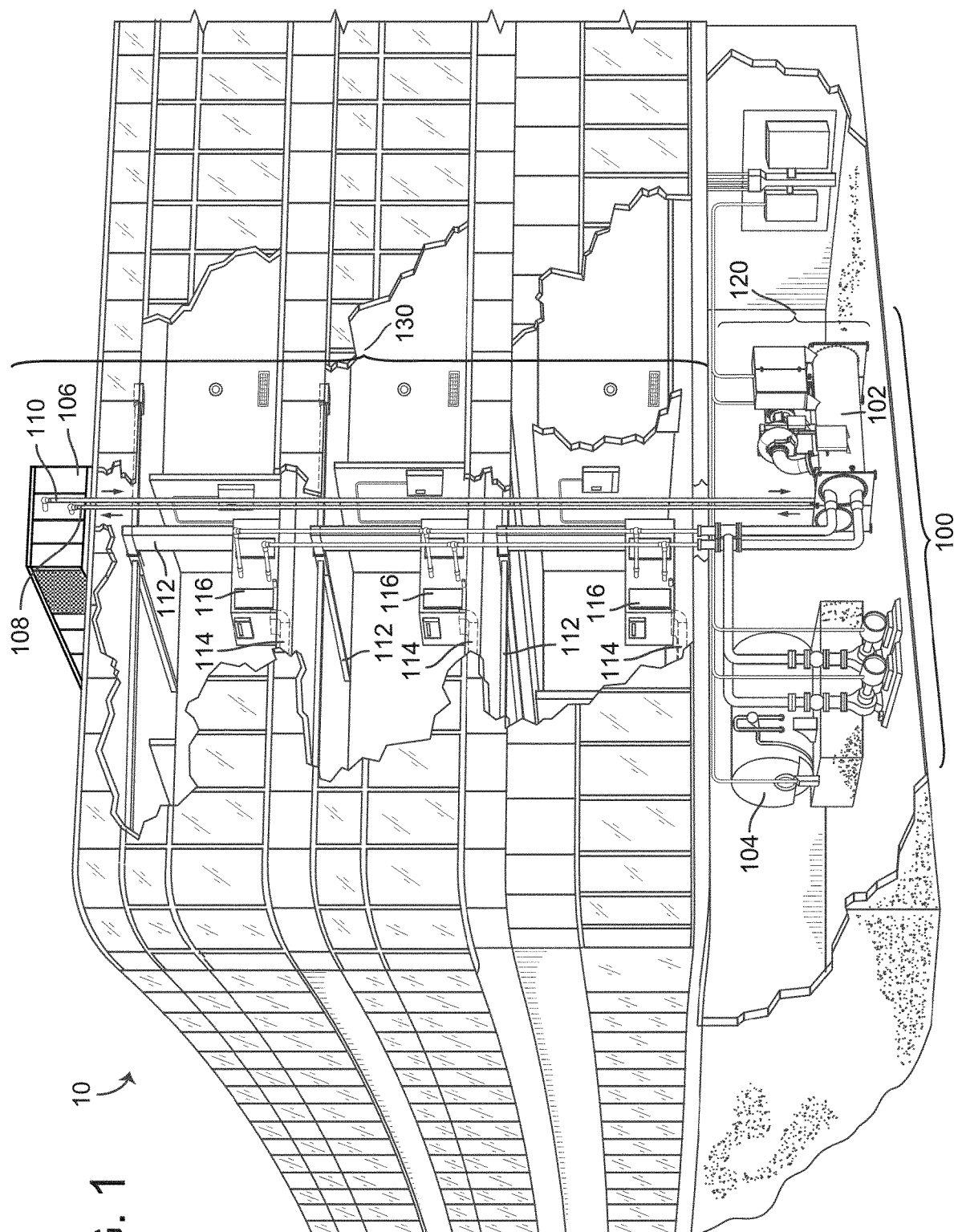
FIG. 1 is a drawing of a building equipped with a HVAC system, according to some embodiments.

Referring generally to the FIGURES, systems and methods for adjusting occupant discomfort are shown. In building spaces, rooms, zones, etc., a temperature differential may cause occupants to become uncomfortable. The occupants may become too cold, or too warm. A controller can be configured to operate building equipment to provide heating and/or cooling to the space to maintain occupant comfort. The controller can perform feedback control (e.g., on-off control) to determine how to operate the building equipment (e.g., to heat the space, cool the space, standby, etc.). Occupants can specify allowable or comfortable temperature ranges that the controller uses to maintain occupant comfort. However, due to the temperature differential, changing occupant preferences, outdoor temperature, seasons, etc., occupants may eventually find the temperature ranges uncomfortable.

The controller can monitor the occupant comfort by observing how frequently the occupant(s) change a temperature setpoint. For example, the controller can determine that the temperature setpoint or temperature setpoint boundaries should be increased if the occupant regularly increases the temperature setpoint. Likewise, the controller can determine that the temperature setpoint or temperature setpoint boundaries should be decreased if the occupant regularly decreases the temperature setpoint.

The controller can receive and collect occupant setpoint adjustment data/information over a time period (e.g., a month, a week, two months, etc.). The controller can filter the occupant setpoint adjustment data to identify occupant setpoint changes that indicate occupant discomfort. The controller can partition each day of occupant setpoint change data into day types (e.g., weekday and weekend). The controller may further partition the occupant setpoint change data into daily time periods (e.g., four daily time periods, eight daily time periods, etc.). The controller may then count a number of occupant setpoint increases and occupant setpoint decreases for each daily time period of each day of both day types. The controller can then adjust temperature setpoints, or temperature setpoint boundaries based on the number of occupant setpoint increases and/or the number of occupant setpoint decreases. The controller can adjust the setpoints or setpoint boundaries for all daily time periods, or may adjust the setpoints or setpoint boundaries for all daily time periods independently. For example, the controller may increase the first daily time period of all days of a particular day type based on the number of occupant setpoint increases or occupant setpoint decreases of one or more daily time periods of the particular day type.

Advantageously, this allows the controller and the system to adapt and change to the occupants' preferences. The controller can also adapt to provide comfortable conditions for when the space is occupied or during warmer/colder times of day. For example, if an occupant typically prefers the temperature in the space to be warmer at night and cooler in the morning, the controller can identify the occupant's preferences and adapt the setpoint and setpoint boundaries to reflect these preferences. Advantageously, if occupancy of the space changes, the controller can adapt the system to learn the new occupants' comfort and adjust the setpoint and/or setpoint boundaries accordingly.

Building HVAC Systems and Building Management Systems

Figure 2:
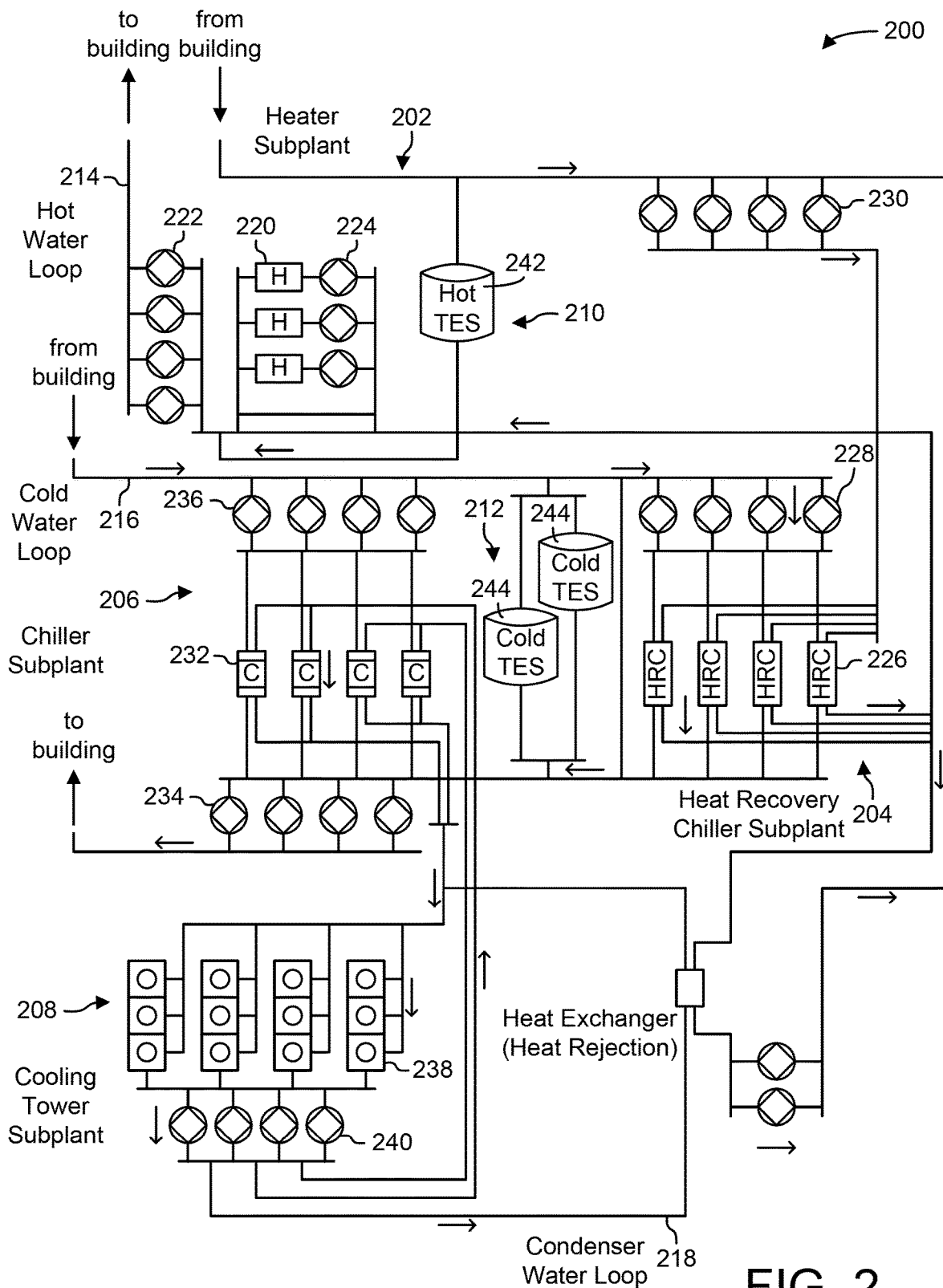
FIG. 2 is a block diagram of a waterside system which can be used to serve the building of FIG. 1, according to some embodiments.
Figure 3:
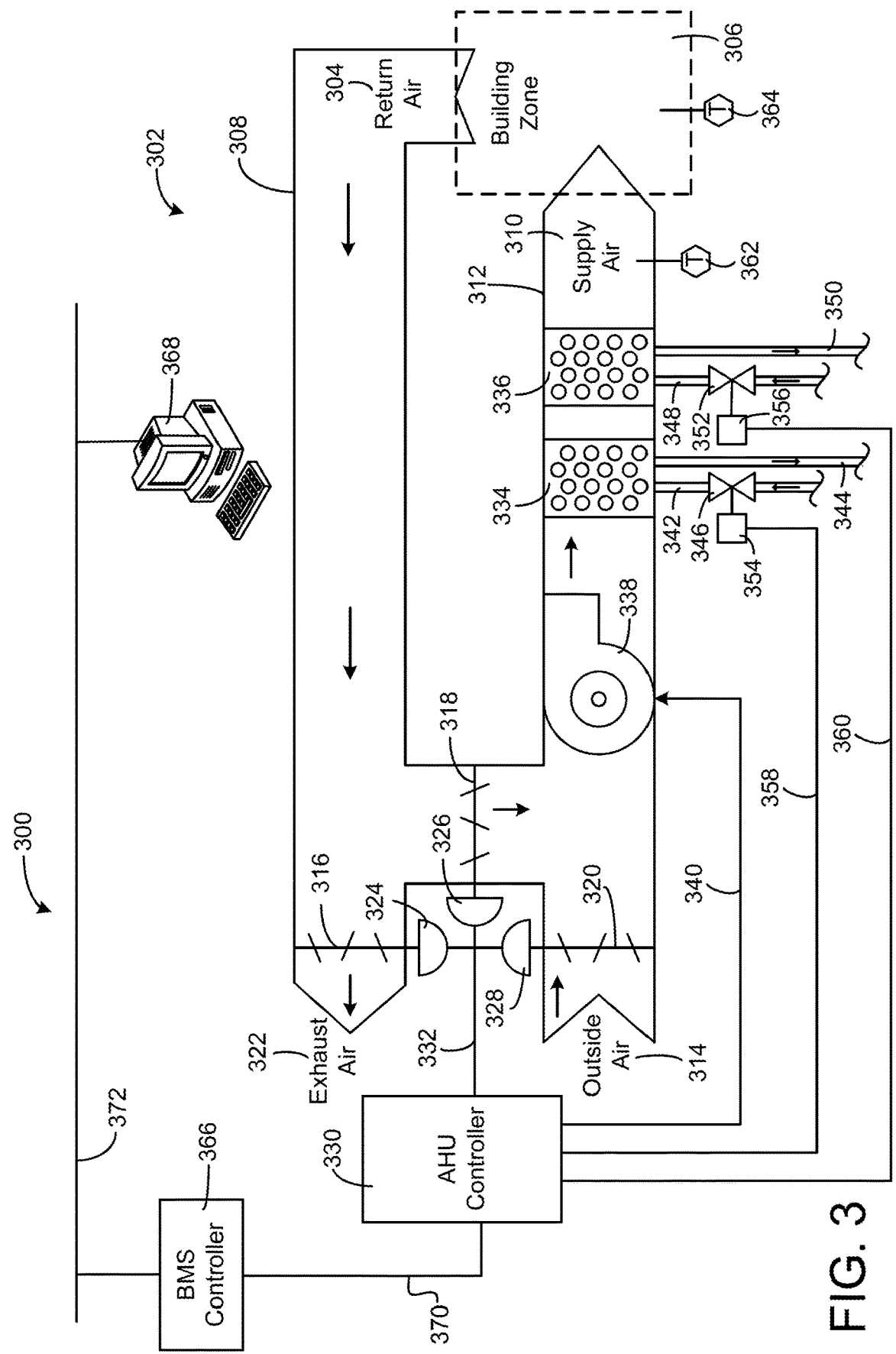
FIG. 3 is a block diagram of an airside system which can be used to serve the building of FIG. 1, according to some embodiments.
Figure 4:
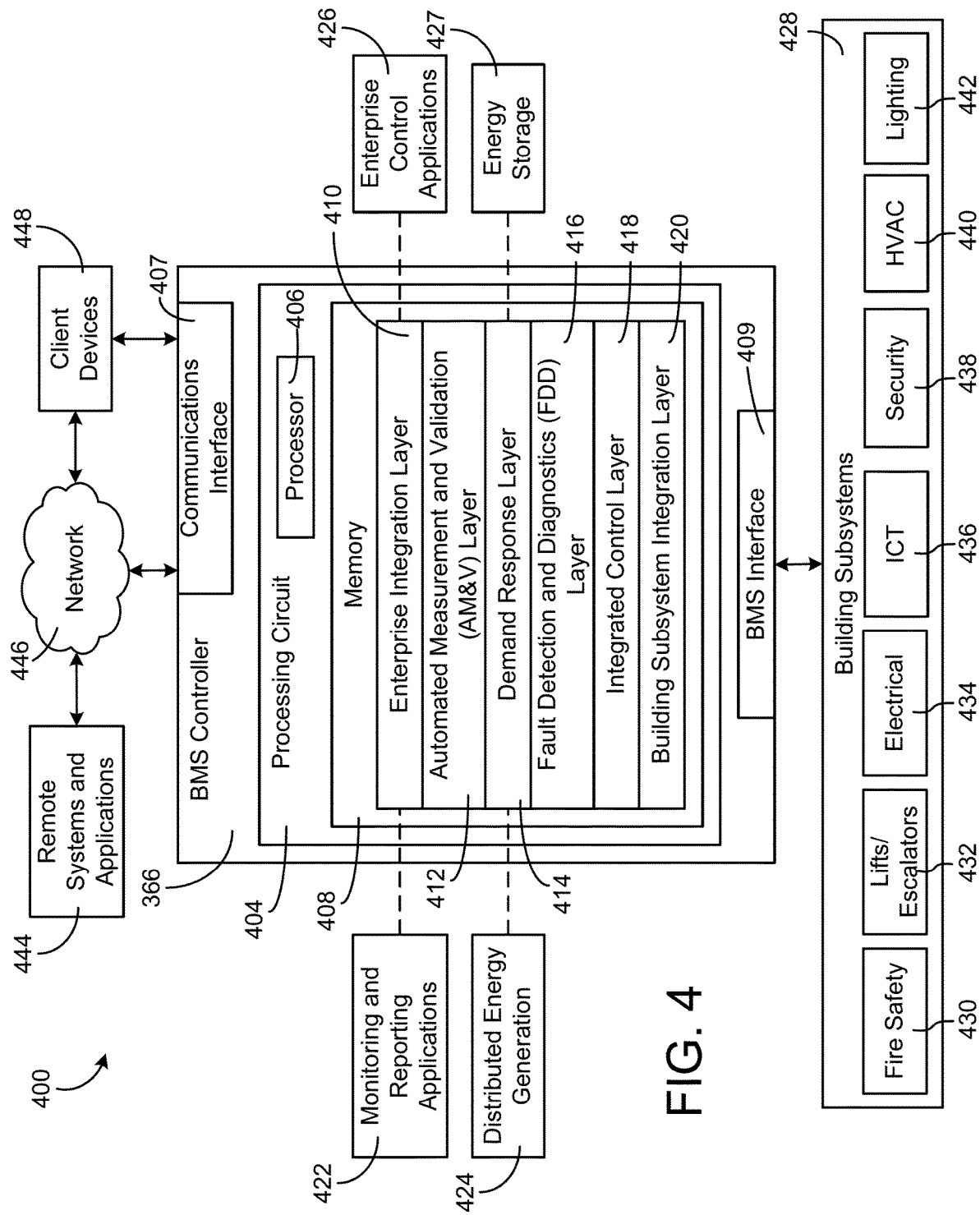
FIG. 4 is a block diagram of a building management system (BMS) which can be used to monitor and control the building of FIG. 1, according to some embodiments.
Figure 5:
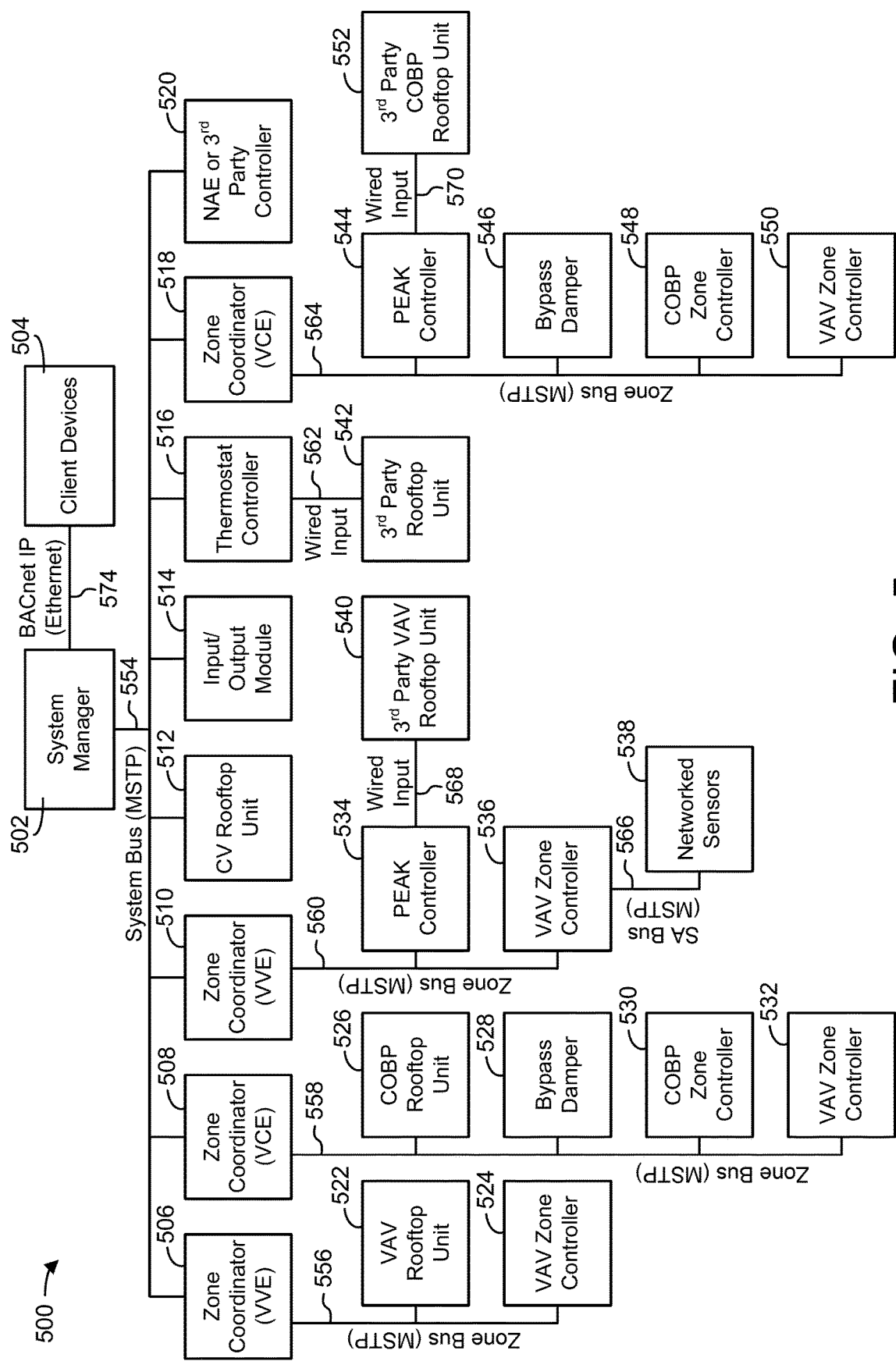
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314.

AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more humanmachine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or nonmobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Setpoint Boundary Adjustment
Setpoint Adjustment System

Figure 6:
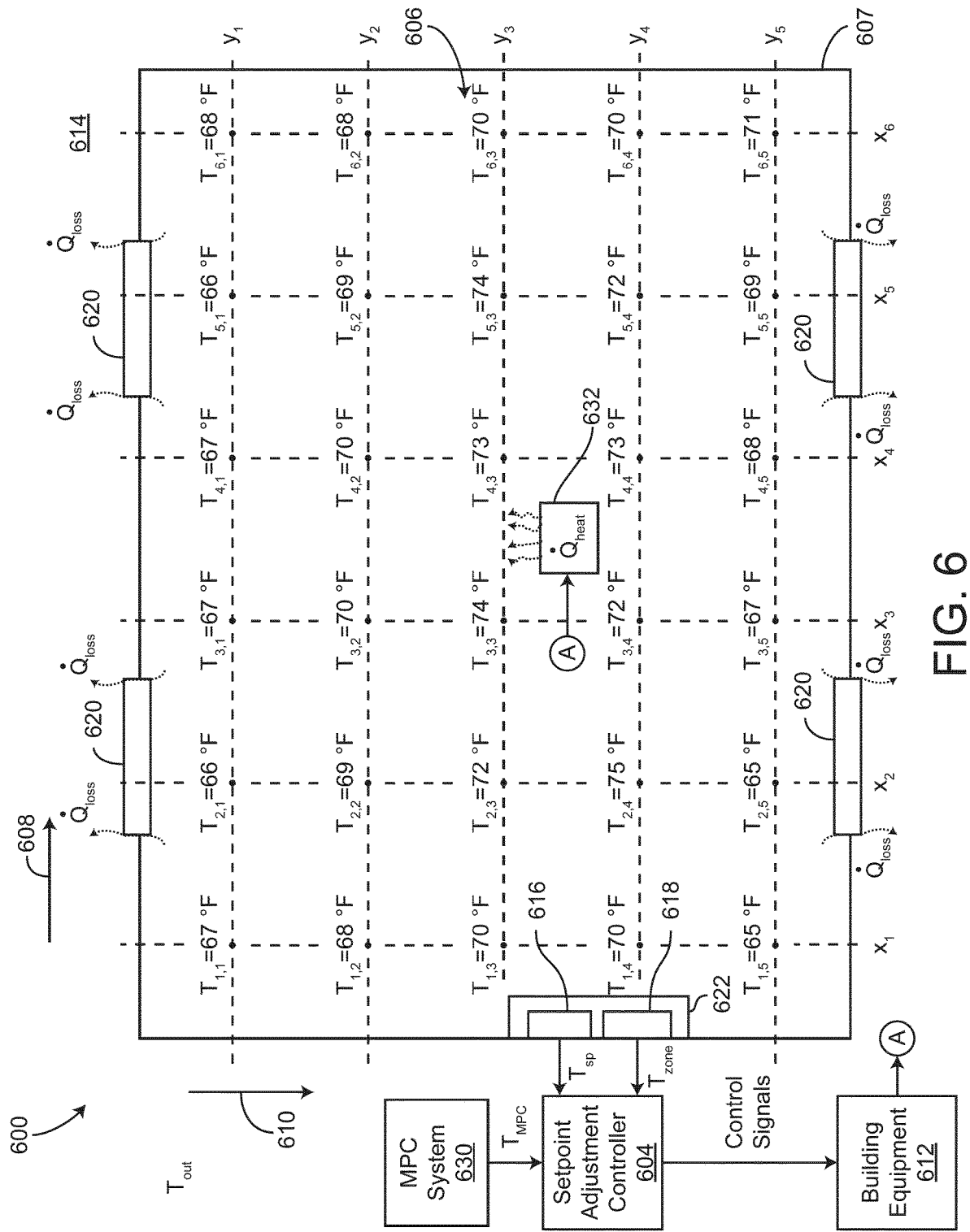
FIG. 6 is a diagram of an automatic setpoint boundary adjustment system for a room with a temperature differential, according to some embodiments.
Figure 7:
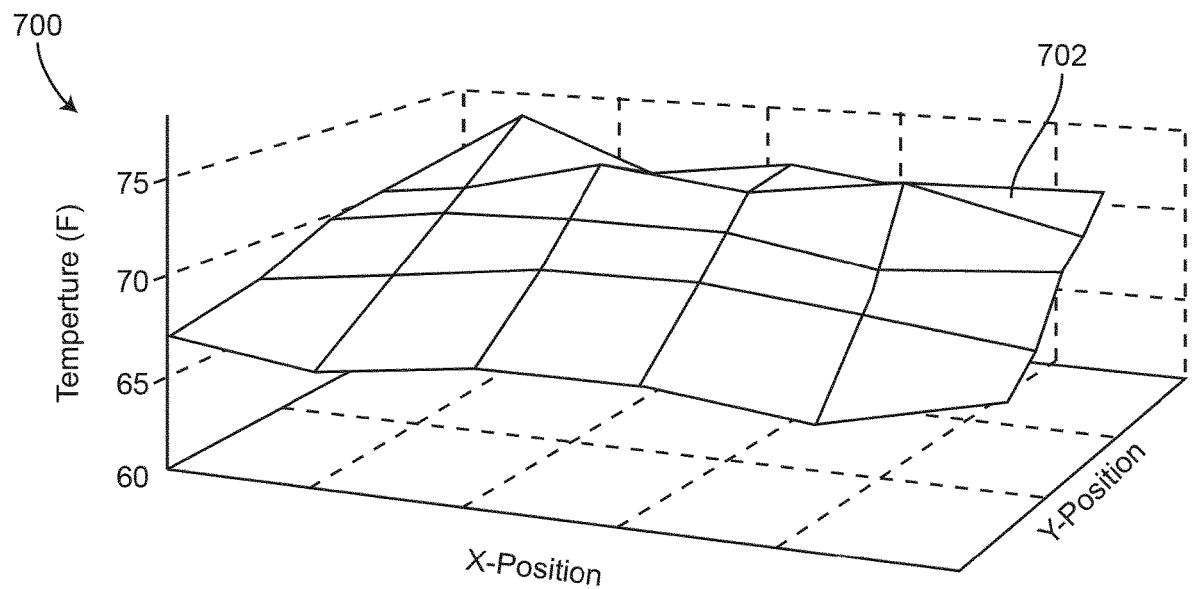
FIG. 7 is a surface graph of the temperature differential of the room of FIG. 6, according to some embodiments.

Referring now to FIGS. 6 and 7, a control system 600 is shown. Control system 600 can be configured to adjust setpoint boundaries (e.g. minimum and maximum allowable setpoint boundaries) to maintain a level of comfort in a space. Control system 600 includes a setpoint adjustment controller 604, building equipment 612, and a model predictive control (MPC) system 630. In some embodiments, MPC system 630 is a remote server. In some embodiments, MPC system 630 is local or on site. MPC system 630 is configured to perform model predictive control to determine optimal setpoint boundaries that minimize costs associated with operating equipment to provide heating and/or cooling to building 10. In some embodiments, MPC system 630 is configured to determine the setpoint boundaries using any of the systems, techniques, methods, etc., described in greater detail in U.S. application Ser. No. 15/473,496, filed Mar. 29, 2017, the entire disclosure of which is incorporated by reference herein.

Control system 600 is configured to receive setpoints, setpoint boundaries, etc., from MPC system 630. In some embodiments, setpoint adjustment controller 604 is communicably connected with MPC system 630. Any of the functionality of MPC system 630 can be implemented by setpoint adjustment controller 604. In some embodiments, setpoint adjustment controller 604 is located off-site and is configured to generate control signals for building equipment 612 and provide the control signals to building equipment 612 wirelessly. In some embodiments, setpoint adjustment controller 604 is wiredly communicably connected with building equipment 612.

Setpoint adjustment controller 604 is configured to generate control signals to operate building equipment 612 to serve a room, a zone, a space, etc., shown as room 607. Room 607 includes an interior 606, according to some embodiments. Depending on various system parameters of room 607 (e.g., where building equipment 612 is located, radiative heat transfer through windows 620, how room 607 stores heat, orientation of building 10, etc.), an un-even temperature distribution may be present in room 607. Room 607 can store heat unevenly throughout an interior 606, thereby resulting in a temperature differential throughout room 607. In some embodiments, environmental conditions (e.g., temperature, humidity, sunlight, etc.) can also affect the temperature differential throughout room 607. Room 607 is shown to include a horizontal or a first direction 608 and a vertical or second direction 610. As shown in FIG. 6, the temperatures as various locations throughout room 607 vary.

Building equipment 612 can be configured to provide heating and/or cooling to room 607. In some embodiments, building equipment 612 is configured to receive the control signals from setpoint adjustment controller 604 and provide heating and/or cooling to room 607 through a vent 632. For example, building equipment 612 can be a variable refrigerant flow (VRF) system, a variable air volume (VAV) system, a room air conditioning system (RAC), a packaged air conditioning system (PAC), etc. In some embodiments, building equipment 612 provides hot or cold air to vent 632 and the hot or cold air is discharged or recirculated into interior 606 of room 607 to heat or cool room 607. Building equipment 612 can be any HVAC equipment configured to heat or cool room 607.

Setpoint adjustment controller 604 can be configured to communicate with a thermostat, a zone controller, etc., shown as thermostat 622 of room 607. In some embodiments, thermostat 622 and setpoint adjustment controller 604 are the same device. For example, setpoint adjustment controller 604 can be configured to perform any of the functionality of thermostat 622. Likewise, thermostat 622 can be configured to perform any of the functionality of setpoint adjustment controller 604. In some embodiments, thermostat 622 includes a user interface 616 configured to receive an occupant adjustment to the setpoint of room 607. In some embodiments, the user interface can also receive minimum and maximum desired allowable temperatures. For example, an occupant can indicate a minimum temperature of room 607 that is comfortable and a maximum temperature of room 607 that is comfortable. In some embodiments, thermostat 622 is configured to provide setpoint adjustment controller 604 with the occupant defined temperature setpoint and/or the minimum and maximum allowable/desired temperatures. In some embodiments, thermostat 622 and/or setpoint adjustment controller 604 is configured to provide MPC system 630 with any of the minimum and maximum temperature values input by the occupant via thermostat 622. In some embodiments, MPC system 630 uses the minimum and maximum allowable temperature values indicated by the occupant as constraints during MPC.

In some embodiments, thermostat 622 includes a temperature sensor 618. Temperature sensor 618 can be any thermistor, thermocouple, etc., or any other temperature sensor. In some embodiments, temperature sensor 618 is configured to measure a temperature, $T_{zone}$, of room 607 and provide setpoint adjustment controller 604 with the measured temperature $T_{zone}$. In some embodiments, setpoint adjustment controller 604 uses the measured temperature $T_{zone}$ of room 607 as feedback. Setpoint adjustment controller 604 can use the measured temperature $T_{zone}$ and the setpoint temperature (and the minimum and maximum desired/allowable temperatures) to generate control signals for building equipment 612. In some embodiments, setpoint adjustment controller 604 includes a feedback controller and uses the measured temperature $T_{zone}$ one as a value of a performance variable. For example, the feedback controller of setpoint adjustment controller 604 can be a PI controller, a PID controller, an extremum seeking controller, a self-optimizing controller, etc., or any other feedback controller.

In some embodiments, thermostat 622 includes a humidity sensor. The humidity sensor can be configured to measure a humidity or a relative humidity in room 607. In some embodiments, the humidity sensor measures the humidity of room 607 at a location that is approximately the same as the location of temperature sensor 618. Thermostat 622 can also be configured to measure a concentration of particulate matter (e.g., PM 2.5) within interior 606 of room 607. In some embodiments, thermostat 622 and/or setpoint adjustment controller 604 receive sensor measurements from sensors (e.g., temperature sensors, humidity sensors, etc.) that are positioned about room 607.

In some embodiments, an occupant may become uncomfortable in certain areas of room 607 due to excessively high or low temperature or humidity values. For example, thermostat 622 can measure that various environmental conditions (e.g., temperature, humidity, etc.) are within comfortable ranges while various parts of room 607 may be at uncomfortable environmental conditions. This is due to the temperature differential throughout room 607, according to some embodiments. The temperature differential can be due to a variety of factors, including but not limited to, location of vent 632, heating or cooling mode of building equipment 612, wall insulation of room 607, radiative heat transfer through windows 620, electric appliances in room 607, heat loss or transfer through or around windows 620, doors, etc.

Referring to FIG. 7, a surface graph 700 includes a surface 702 that illustrates the temperature or environmental condition differential throughout room 607, according to some embodiments. Surface 702 includes various peaks and valleys. If thermostat 622 is configured to measure the temperature or humidity at one of the peaks or valleys, the temperature or humidity measurement may be unrepresentative of an average temperature in the room. This can result in an occupant becoming uncomfortable and changing the temperature setpoint at thermostat 622. In some embodiments, setpoint adjustment controller 604 is configured to monitor occupant initiated setpoint changes and adjust the setpoint of room 607 or boundaries of the allowable temperature of room 607. Advantageously, control system 600 can adapt to the occupants preferred environmental conditions. Additionally, setpoint adjustment controller 604 can also learn occupant comfort preferences (e.g., a preferred temperature) for different day types, times of day, etc. Advantageously, this improves occupant comfort and provides an environmental condition control system that adapts to occupant preferences.

Figure 8:
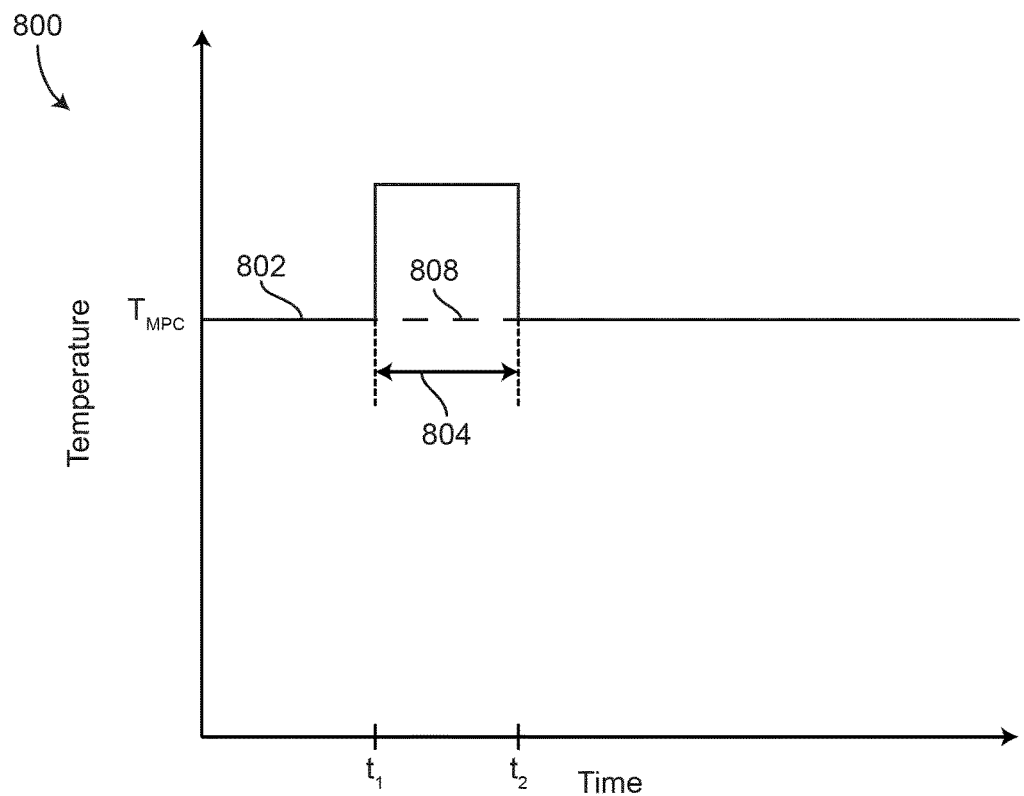
FIG. 8 is a graph showing a temperature setpoint being reset after an occupant setpoint adjustment for the system of FIG. 5, according to some embodiments.

Referring to FIG. 8, a graph 800 shows setpoint temperature (the Y-axis) over time (the X-axis). Graph 800 includes series 802 and series 808, according to some embodiments. Series 802 is an actual setpoint temperature of a room, a space, a zone, etc. Series 808 is the setpoint temperature of the room as determined or provided by MPC system 630, according to some embodiments. The Y-axis value of series 808 is shown equal to $T_{MPC}$ (the setpoint received from MPC system 630).

The Y-axis value of series 802 is the actual setpoint, $T_{sp}$, of one of the rooms that setpoint adjustment controller 604 serves, according to some embodiments. As shown in graph 800, the actual setpoint $T_{sp}$ of room 607 is increased at time $t_1$ by an occupant of room 607, thereby resulting in a difference between series 802 and series 808. The difference can remain for a time interval 804 from time $t_1$ to time $t_2$ when the actual setpoint $T_{sp}$ is reset to the estimated setpoint $T_{MPC}$. In some embodiments, this is due to the actual setpoint $T_{sp}$ between time $t_1$ and time $t_2$ being outside of a maximum allowable temperature boundary.

Setpoint adjustment controller 604 can monitor and count setpoint changes as shown in FIG. 8 and determine adjustments to the minimum and maximum boundaries of $T_{sp}$ to improve occupant comfort. In some embodiments, setpoint adjustment controller 604 also adjusts the setpoint $T_{sp}$. Setpoint adjustment controller 604 can use historical data and adapt over time to the occupant comfort preferences.

Figure 9:
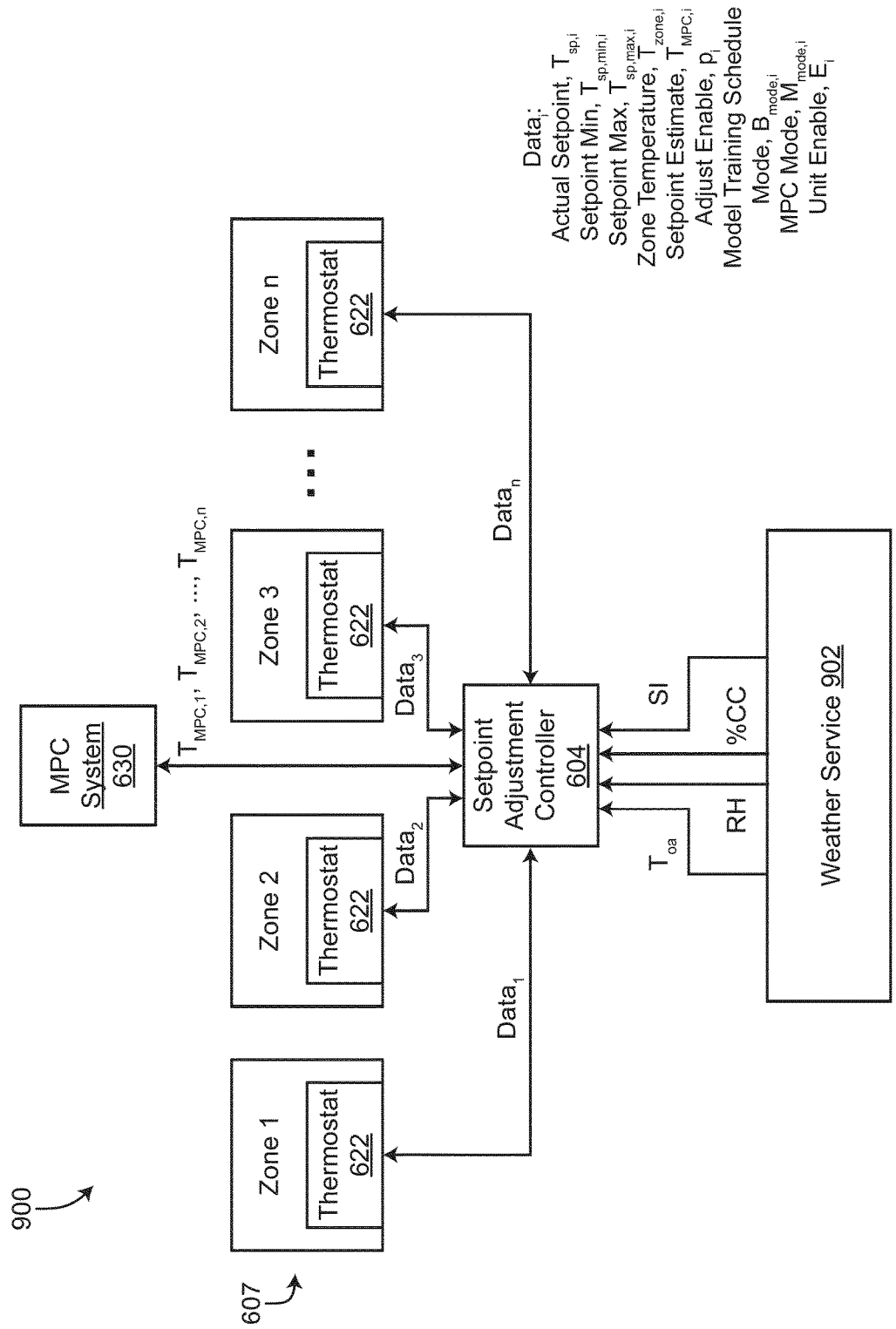
FIG. 9 is a block diagram of an environmental control system that can be used to automatically adjust setpoint boundaries of various zones, according to some embodiments.

Referring now to FIG. 9, an environmental control system 900 includes setpoint adjustment controller 604, MPC system 630, and a weather service 902. Weather service 902 can provide setpoint adjustment controller 604 with various outside environmental conditions. In some embodiments, setpoint adjustment controller 604 is configured to receive any of outdoor air temperature $T_{oa}$, outdoor relative humidity RH, cloud cover % CC, and solar irradiance SI from weather service 902. In some embodiments, setpoint adjustment controller 604 collects time series data of the outdoor air temperature $T_{oa}$, the outdoor relative humidity RH, the cloud cover % CC, and the solar irradiance SI over a time period. For example, setpoint adjustment controller 604 can collect weather time series data over a month. In some embodiments, weather service 902 is a remote device or network (e.g., the National Weather Service). In some embodiments, weather service 902 is a collection of various sensors configured to measure any of the weather data described herein and provide the weather data to setpoint adjustment controller 604. Setpoint adjustment controller 604 can collect the weather data over a time period and use the weather data to determine setpoint or setpoint boundary adjustments.

Referring still to FIG. 9, setpoint adjustment controller 604 is shown receiving data from various zones or rooms 607. In some embodiments, zones 607 are rooms, spaces, areas, etc., of a building or a campus. For example, setpoint adjustment controller 604 can receive $Data_i$ from any n number of zones 607. In some embodiments, setpoint adjustment controller 604 receives $Data_i$ from thermostat 622 of any ith zone 607 of the n number of zones 607. In some embodiments, setpoint adjustment controller 604 receives some of the data of $Data_i$ from thermostat 622, and some of $Data_i$ from MPC system 630.

In some embodiments, setpoint adjustment controller 604 receives the actual setpoint $T_{sp,i}$ from thermostats 622. In some embodiments, setpoint adjustment controller 604 receives the minimum and maximum setpoint boundaries $T_{sp,min,i}$ and $T_{sp,max,i}$ from thermostats 622. In some embodiments, setpoint adjustment controller 604 receives the zone temperature (as measured by temperature sensor 618 and/or thermostat 622) $T_{zone,i}$ from zones 607. In some embodiments, setpoint adjustment controller 604 receives the setpoint estimate $T_{MPC,i}$ from MPC system 630. In some embodiments, setpoint adjustment controller 604 receives a binary value of whether or not comfort adjustment (e.g., the functionality of setpoint adjustment controller 604) is enabled for the ith zone 607. The binary value indicating whether or not comfort adjustment is enabled can be referred to as $p_i$. In some embodiments, $p_i$ is a Boolean quantity. In some embodiments, setpoint adjustment controller 604 receives $p_i$ from zones 607 or from thermostats 22. In some embodiments, setpoint adjustment controller 604 receives a model training schedule from zones 607 (e.g., thermostats 622) and/or MPC system 630. In some embodiments, setpoint adjustment controller 604 receives a binary mode variable (e.g., heating or cooling mode) $B_{mode,i}$ from thermostats 622. In some embodiments, $B_{mode,i}$ indicates whether building equipment 612 that serves the ith zone 607 is in the heating or the cooling mode. In some embodiments, setpoint adjustment controller receives an MPC operational mode variable, $M_{mode,i}$ from thermostats 622 and/or MPC system 630. The MPC operational mode variable can be a binary variable that indicates whether MPC system 630 is operating in an advisory mode or an automatic mode. In some embodiments, setpoint adjustment controller 604 receives a unit enable variable $E_i$ from thermostats 622. In some embodiments, unit enable variable $E_i$ is a binary variable that indicates whether thermostat 622 is active or not (e.g., whether or not building equipment 612 is active.

Setpoint adjustment controller 604 can receive and collect any of the variables, data, sensor data, schedules, etc., described hereinabove over a time duration $\Delta t$. In some embodiments, the time duration $\Delta t$ is one month. In other embodiments, the time duration $\Delta t$ is a predetermined value that is greater than one month or less than one month (e.g., two months, a week, etc.). Setpoint adjustment controller 604 can receive and produce a time series data vector for any of the data, variables, sensor data, schedules, etc., described hereinabove. In some embodiments, setpoint adjustment controller 604 also generates a time vector over the time duration $\Delta t$. For example, setpoint adjustment controller 604 can receive the actual setpoint from the first zone 607 $T_{sp,1}$ over a month and construct a vector $T_{sp,1}$ that includes all the values of the actual setpoint $T_{sp,1}$ received over the time duration $\Delta t$. In some embodiments, setpoint adjustment controller 604 also generates a time vector t. The time vector t and the vector $T_{sp,1}$ can have a same length or size. In this way, setpoint adjustment controller 604 can store and retrieve the various actual setpoint values from vector $T_{sp,1}$ and the time at which the actual setpoint values were recorded from the time vector t. Setpoint adjustment controller 604 can similarly construct vectors for any of the other data described hereinabove.

Setpoint Adjustment Controller

Figure 10:
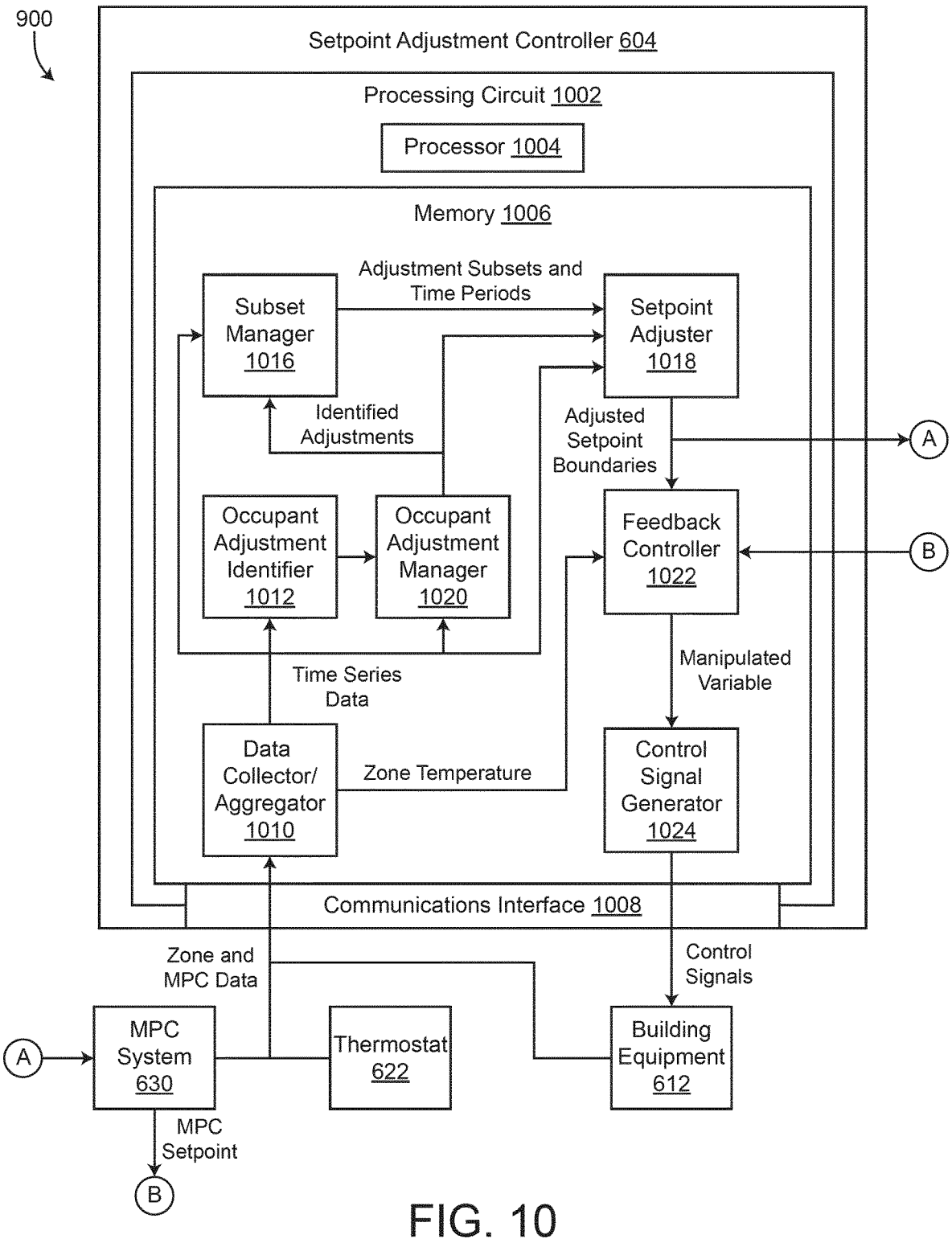
FIG. 10 is a block diagram of a setpoint adjustment controller of the system of FIG. 9, according to some embodiments.

Referring now to FIG. 10, setpoint adjustment controller 604 is shown in greater detail. Setpoint adjustment controller 604 is configured to receive any of the data described in greater detail above with reference to FIG. 9 over a time duration, and analyze the received data to determine changes to the setpoint boundaries. In some embodiments, setpoint adjustment controller 604 is configured to analyze the received data to identify occupant setpoint changes. Setpoint adjustment controller 604 can use the identified occupant setpoint changes to determine appropriate changes to the setpoint boundaries to improve occupant comfort.

Referring still to FIG. 10, setpoint adjustment controller 604 is shown to include a communications interface 1008. Communications interface 1008 may facilitate communications between setpoint adjustment controller 604 and external applications (e.g., MPC system 630, thermostats 622, building equipment 612, etc.) for allowing control and monitoring of zones 607 or any of the components, devices, equipment, sensors, etc., of a plant. Communications interface 1008 may also facilitate communications between setpoint adjustment controller 604 and client devices. Communications interface 1008 may facilitate communications between setpoint adjustment controller 604 and building subsystems, thermostats, sensors, other systems, devices, etc.

Communications interface 1008 can be or include wired or wireless communications interfaces (e.g., jacks, antennas, transmitters, receivers, transceivers, wire terminals, etc.) for conducting data communications with building equipment 612, thermostats 622, MPC system 630, etc., or other external systems or devices. In various embodiments, communications via communications interface 1008 can be direct (e.g., local wired or wireless communications) or via a communications network (e.g., a WAN, the Internet, a cellular network, etc.). For example, communications interface 1008 can include an Ethernet card and port for sending and receiving data via an Ethernet-based communications link or network. In another example, communications interface 1008 can include a Wi-Fi transceiver for communicating via a wireless communications network. In another example, communications interface 1008 can include cellular or mobile phone communications transceivers. In one embodiment, communications interface 1008 is a power line communications interface. In other embodiments, communications interface 1008 is an Ethernet interface.

Still referring to FIG. 10, setpoint adjustment controller 604 is shown to include a processing circuit 1002 including a processor 1004 and memory 1006. Processing circuit 1002 can be communicably connected to communications interface 1008 such that processing circuit 1002 and the various components thereof can send and receive data via communications interface 1008. Processor 1004 can be implemented as a general purpose processor, an application specific integrated circuit (ASIC), one or more field programmable gate arrays (FPGAs), a group of processing components, or other suitable electronic processing components.

Memory 1006 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1006 can be or include volatile memory or non-volatile memory. Memory 1006 can include database components, object code components, script components, or any other type of information structure for supporting the various activities and information structures described in the present application. According to some embodiments, memory 1006 is communicably connected to processor 1004 via processing circuit 1002 and includes computer code for executing (e.g., by processing circuit 1002 and/or processor 1004) one or more processes described herein.

In some embodiments, setpoint adjustment controller 604 is implemented within a single computer (e.g., one server, one housing, etc.). In various other embodiments setpoint adjustment controller 604 can be distributed across multiple servers or computers (e.g., that can exist in distributed locations).

Referring still to FIG. 10, setpoint adjustment controller 604 includes a data collector/aggregator 1010, according to some embodiments. In some embodiments, data collector 1010 is configured to receive any of the data described in greater detail above with reference to FIG. 9. In some embodiments, data collector 1010 is configured to collect any of the zone and MPC data received from MPC system 630 and thermostats 622. In some embodiments, data collector 1010 also receives equipment operational data from building equipment 612. For example, data collector 1010 can receive power consumption, efficiency, operating point, etc., data from building equipment 612.

Data collector 1010 is configured to collect any of the receive data over the time duration $\Delta t$ and generate any of the time series data vectors described in greater detail above with reference to FIG. 9. For example, data collector 1010 can generate time series data vectors for any of the received data. Data collector 1010 can also generate time vector t.

Data collector 1010 can provide the time series data to occupancy adjustment identifier 1012 and occupant adjustment manager 1020, according to some embodiments. In some embodiments, occupant adjustment identifier 1012 is configured to identify times at which an occupant adjusted the setpoint of thermostat 622. In some embodiments, occupant adjustment manager 1020 is configured to analyze various conditions at times of the occupant adjustments to determine if the occupant adjustment to the setpoint indicates that the occupant is uncomfortable.

In some embodiments, occupant adjustment identifier 1012 counts a number of occupant adjustments to the setpoint of thermostat 622 (e.g., increases or decreases). In some embodiments, occupant adjustment identifier 1012 counts a number of instances of occupant setpoint increases or decreases, regardless of a magnitude of the change/adjustment to the setpoint. For example, if an occupant changes the setpoint from 70 degrees F. to 80 degrees F. at a particular time, occupant adjustment identifier 1012 can count this setpoint change as a single setpoint adjustment. Likewise, if the occupant later decreases the setpoint from 80 degrees F. to 75 degrees F., occupant adjustment identifier 1012 may count an additional setpoint change, regardless of the magnitude of the change. In this way, any change to the setpoint (regardless of a magnitude of the change) can be counted by occupant adjustment identifier 1012 as a single occupant setpoint increase or decrease (depending on the direction of the adjustment/change). The magnitude is not necessarily considered since if an occupant increases or decreases a setpoint, the new setpoint does not necessarily indicate a temperature that the occupant finds comfortable, but rather, that current temperature in the room is uncomfortable to the occupant.

Data collector 1010 is also configured to provide the zone temperature $T_{zone,i}$ to feedback controller 1022 as a performance variable. In some embodiments, feedback controller 1022 can use the zone temperature to determine values of a manipulated variable u to adjust operation of building equipment 612. In some embodiments, data collector 1010 provides feedback controller 1022 with real-time values of the zone temperature $T_{zone,i}$.

Occupant adjustment identifier 1012 can receive an estimated setpoint time series vector $T_{MPC,i}$ from data collector 1010. In some embodiments, occupant adjustment identifier 1012 also receives the time vector t and a time series data vector of the actual setpoint $T_{sp,i}$. Occupant adjustment identifier 1012 can compare all values of the vector $T_{MPC,i}$ to the vector $T_{sp,i}$ to determine if any values of the vector $T_{sp,i}$ deviate from corresponding values of the vector $T_{MPC,i}$. Vectors $T_{MPC,i}$ and $T_{sp,i}$ may have the same length. For example, if vectors $T_{sp,i}$ and $T_{MPC,i}$ have a length of k, occupant adjustment identifier 1012 can compare all the values of $T_{sp,i}$ to corresponding values of $T_{MPC,i}$.

Occupant adjustment identifier 1012 can determine a difference vector $\Delta T_{sp}(j)=T_{sp,i}(j)-T_{MPC,i}(j)$ for all values of $T_{sp,i}$ and $T_{MPC,i}$ (i.e., from j=1 to j=k). If a jth value of $\Delta T_{sp}$ is greater than zero, this indicates that the jth value of $T_{sp,i}$ is greater than the jth value of $T_{MPC,i}$, which may result from an occupant setpoint increase. Similarly, if a jth value of $\Delta T_{sp}$ is less than zero, this indicates that the jth value of $T_{sp,i}$ is less than the jth value of $T_{MPC,i}$, which may result from an occupant setpoint decrease.

In some embodiments, occupant adjustment identifier 1012 compares consecutive values of $T_{sp,i}$ to previous values of $T_{sp,i}$ to determine if an occupant has adjusted the setpoint $T_{sp,i}$. For example, occupant adjustment identifier 1012 can compare $T_{sp,i}(j)$ to $T_{sp,i}(j-1)$ to determine if the occupant has manually adjusted the setpoint. In some embodiments, occupant adjustment identifier 1012 compares $T_{sp,i}(j)$ to $T_{sp,i}(j-1)$ for all consecutive integer values of j=2 to j=k.

Occupant adjustment identifier 1012 uses the changes in $T_{sp,i}$ and the difference between $T_{sp,i}$ and $T_{MPC,i}$ for the various values over the time duration Δt to determine times at which the occupant has manually adjusted (e.g., increased or decreased) the setpoint $T_{sp,i}$. In some embodiments, occupant adjustment identifier 1012 constructs or generates a vector of adjustment times $t_{adj}$. Occupant adjustment identifier 1012 can identify times at which the setpoint is adjusted by the occupant and retrieve corresponding values of the time vector t. For example, if occupant adjustment identifier 1012 determines that the setpoint is adjusted at j=5, j=14, and j=50, the vector $t_{adj}$ may be defined as $t_{adj}$ =[t(5) t(14) t(50)]. The length of vector $t_{adj}$ is the number of occupant adjustments, according to some embodiments. The values of vector $t_{adj}$ are the corresponding values of the time vector t at which the occupant adjustments to the setpoint occur. In some embodiments, vector $t_{adj}$ has a same length as vectors $T_{sp,i}$ and $T_{MPC,i}$. Vector $t_{adj}$ can be a vector of binary values (e.g., 1 or 0) indicating times at which the occupant adjusts the setpoint. For example, if the occupant adjusts the setpoint at j=5,, j=14, and j=50, the vector $t_{adj}$ can be a vector of values of zero (indicating that the setpoint is not adjusted by the occupant at these times), with $t_{adj}(5)=t_{adj}(14)=t_{adj}(50)=1$ (indicating that the setpoint is adjusted by the occupant at times t(5), t(14), and t(50)).

Occupant adjustment manager 1020 receives the vector $t_{adj}$ from occupant adjustment identifier 1012 and determines if the occupant adjustments indicate discomfort at the adjustment times, according to some embodiments. In some embodiments, occupant adjustment manager 1020 receives the vector of values of the zone temperature $T_{zone,i}$ and the vector of values of the setpoint $T_{sp,i}$ from data collector 1010. In some embodiments, occupant adjustment manager 1020 also receives the vector of values of the MPC or estimated setpoint $T_{MPC,i}$. In some embodiments, occupant adjustment manager 1020 also receives a unit enable vector $E_i$ and a mode vector $B_{mode,i}$ from data collector 1010.

Occupant adjustment manager 1020 uses the zone temperature and the setpoint values corresponding to the times that occupant adjustment identifier 1012 determines that occupant setpoint adjustments have been made. In some embodiments, occupant adjustment manager 1020 determines a filtered vector of adjustment times, $t_{adj,filtered}$. In some embodiments, the filtered vector of adjustment times $t_{adj,filtered}$ is a filtered version of $t_{adj}$ that removes or disregards certain occupant setpoint changes (e.g., occupant setpoint changes that do not indicate discomfort).

Occupant adjustment manager 1020 can perform the following procedure for each of the adjustment times indicated by the vector $t_{adj}$. For example, if the vector $t_{adj}$ includes five adjustment times, occupant adjustment manager 1020 performs the following techniques for each of the adjustment times in $t_{adj}$ with the corresponding values of vectors $T_{zone,i}$, $T_{sp,i}$, $T_{MPC,i}$, $E_i$, and $B_{mode,i}$ (e.g., five times, once for each adjustment time). Occupant adjustment manager 1020 can retrieve the corresponding values of $T_{zone,i}$, $T_{MPC,i}$, and $T_{sp,i}$ at the adjustment times. For example, occupant adjustment manager 1020 can retrieve the values of $T_{zone,i}$, $T_{MPC,i}$, and $T_{sp,i}$ for the various values of $t_{adj}$.

If the value of $B_{mode,i}$ indicates that building equipment 612 is in the cooling mode of operation at the time of the occupant setpoint change, occupant adjustment manager 1020 determines a difference between the zone temperature and the estimated or MPC setpoint, according to some embodiments. Occupant adjustment manager 1020 can determine $T_{zone,i}-T_{MPC,i}$ for occupant setpoint changes when building equipment 612 is in the cooling mode of operation. Occupant adjustment manager 1020 can also compare the corresponding values of $T_{MPC,i}$ and $T_{sp}$ to each other to determine if the estimated/MPC setpoint value is less than or greater than (or equal to) the actual setpoint temperature. If both $T_{zone,i}-T_{MPC,i}$ is greater than a predetermined threshold value (e.g., 1 degree Celsius), and $T_{MPC,i}$ is greater than the $T_{sp,i}$, occupant adjustment manager 1020 determines that the occupant setpoint change should be disregarded since either the zone temperature is in a transient phase or the system is saturated. Occupant adjustment manager 1020 can perform this process for each of the identified adjustment times (e.g., for all of the values of $t_{adj}$) to determine which of the occupant setpoint changes should be removed.

If the value of $B_{mode,i}$ indicates that building equipment 612 is in the heating mode of operation at the time of the occupant setpoint change, occupant adjustment manager 1020 determines a difference between the estimated or MPC setpoint and the zone temperature, according to some embodiments. Occupant adjustment manager 1020 can determine $T_{MPC,i}-T_{zone,i}$ for occupant setpoint changes when building equipment 612 is in the heating mode of operation. Occupant adjustment manager 1020 can also compare the corresponding values of $T_{MPC,i}$ and $T_{sp}$ to each other to determine if the estimated/MPC setpoint value is less than or greater than (or equal to) the actual setpoint temperature. If both $T_{MPC,i}-T_{zone,i}$ is greater than a predetermined threshold value (e.g., 1 degree Celsius), and $T_{MPC,i}$ is less than $T_{sp,i}$, occupant adjustment manager 1020 determines that the occupant setpoint change should be disregarded since either the zone temperature is in a transient phase or the system is saturated. Occupant adjustment manager 1020 can perform this process for each of the identified adjustment times (e.g., for all of the values of $t_{adj}$) to determine which of the occupant setpoint changes should be removed.

If the setpoint $T_{sp,i}$ is between the zone temperature $T_{zone,i}$ and the MPC setpoint $T_{MPC,i}$, occupant adjustment manager 1020 disregards these occupant setpoint changes, according to some embodiments. These occupant setpoint changes can be removed by occupant adjustment manager 1020 regardless of a mode of operation of building equipment 612. Occupant adjustment manager 1020 performs these processes to remove various occupant setpoint changes to generate the reduced or filtered set/vector of occupant setpoint changes $t_{adj,filtered}$. In some embodiments, occupant adjustment manager 1020 provides the reduced set of occupant setpoint changes $t_{adj,filtered}$ to subset manager 1016 and setpoint adjuster 1018.

Subset manager 1016 receives the reduced set of occupant setpoint changes $t_{adj,filtered}$ from occupant adjustment manager 1020 as well as the time vector t from data collector 1010. Subset manager 1016 is configured to analyze the time vector t to identify various day types and setpoint changes that occur during these day types. In some embodiments, subset manager 1016 partitions the reduced set of occupant setpoint changes $t_{adj,filtered}$ into subsets by day type. Subset manager 1016 can define day types based on weekday or weekend, day of the week, holidays, occupancy schedules, occupant work schedules, etc. For example, if subset manager 1016 partitions the reduced set of occupant setpoint changes $t_{adj,filtered}$ into weekday and weekend subsets, subset manager 1016 can create a first subset of the occupant setpoint changes $t_{adj,filtered}$ that occur during weekends (e.g., that occur on Saturdays and Sundays) and a second subset of the occupant setpoint changes $t_{adj,filtered}$ that occur during weekdays (e.g., that occur on any of Monday, Tuesday, Wednesday, Thursday, or Friday). Likewise, subset manager 1016 can create seven subsets of the occupant setpoint changes $t_{adj,filtered}$ to partition the occupant setpoint changes $t_{adj,filtered}$ into weekday subsets.

In some embodiments, subset manager 1016 further divides each of the subsets (partitioned by day types) into various time periods for each day. For example, subset manager 1016 can partition each day into an $n_{daily}$ amount of time periods. In some embodiments, $n_{daily}$ time periods depends on the day type. For example, weekdays may be partitioned into four time periods, while weekends may be partitioned into 12 time periods. In some embodiments, $n_{daily}$ time periods is the same for all day types.

In some embodiments, subset manager 1016 divides the reduced set of occupant changes $t_{adj,filtered}$ for each day, regardless of day type, into the same $n_{daily}$ amount of time periods. For example, the reduced set of occupant changes $t_{adj,filtered}$ can be divided into two sets (weekday and weekend). The two sets of weekday and weekend occupant setpoint changes are divided into four time periods for each day (e.g., a first time period from midnight to 6 AM, a second time period from 6 AM to noon, a third time period from noon to 6 PM, and a fourth period from 6 PM to midnight), according to some embodiments. In some embodiments, the time periods are equal in length/duration (e.g., 24/4=6 hours). In some embodiments, the time periods of each day are unequal in length/duration. For example, the first time period may be 6 hours (from midnight to 6 AM), the second time period may be 6 hours (from 6 AM to noon), the third time period may be 9 hours (from noon to 9 PM), and the fourth time period may be 3 hours (from 9 PM to midnight). In some embodiments, occupant setpoint changes that occur during similar day types and similar time periods are aggregated. For example, all of occupant setpoint changes of the first time period of weekdays can be aggregated, all of the occupant setpoint changes of the second time period of weekdays can be aggregated, etc.

Subset manager 1016 provides setpoint adjuster 1018 with the reduced set of occupant changes $t_{adj,filtered}$ divided or partitioned by day type and daily time periods. Setpoint adjuster 1018 is configured to receive the reduced set of occupant changes $t_{adj,filtered}$ divided/partitioned according to day type and daily time periods and use the reduced set of occupant changes $t_{adj,filtered}$ to adjust the setpoint boundaries (i.e., to increase or decrease $T_{sp,min,i}$ and $T_{sp,max,i}$ concurrently or independently).

Setpoint adjuster 1018 is configured to count the number of occupant setpoint increases and decreases for each daily time period of each day type of the reduced set of occupant setpoint changes $t_{adj,filtered}$, according to some embodiments. In some embodiments, setpoint adjuster 1018 counts the number of setpoint increases and decreases for each daily time period of each day type of the reduced set of occupant setpoint changes $t_{adj,filtered}$ since a previous setpoint boundary adjustment (e.g., time $t_{sp,adjust}$).

The number of occupant setpoint increases counted for the first time period of the weekend day type is referred to as $n_{1,we,inc}$, according to some embodiments. The number of occupant setpoint increases counted for the second time period of the weekend day types is referred to as $n_{2,we,inc}$, according to some embodiments. The number of occupant setpoint increases counted for the second time period of the weekend day types is referred to as $n_{3,we,inc}$, according to some embodiments. The number of occupant setpoint increases counted for the second time period of the weekend day types is referred to as $n_{4,we,inc}$, according to some embodiments. The number of occupant setpoint decreases counted for the various time periods of the weekend day type are referred to similarly as variables $n_{1,we,dec}$, $n_{2,we,dec}$, $n_{3,we,dec}$, and $n_{4,we,dec}$, according to some embodiments. Similar variables are defined for weekday occupant setpoint increases/decreases that are counted by setpoint adjuster using "wd" as the second subscript.

Generally, the number of occupant setpoint changes counted by setpoint adjuster 1018 based on the reduced set of occupant setpoint changes $t_{adj,filtered}$ are referred to as variables $n_{x,y,z}$, where the first subscript x is an integer indicating which time period of day the count is associated with (e.g., 1 for the first time period, 2 for the second time period, etc.), the second subscript y is the day type (e.g., "we" for weekend day type, "wd" for weekday day type, etc.), and the third subscript z indicates whether the count is for occupant setpoint increases or decreases (e.g., "inc" or "dec").

In some embodiments, for each of the time periods of each day, setpoint adjuster 1018 considers setpoint increases as positive values and setpoint decreases as negative values (e.g., +1 or −1). In this way, the number of occupant setpoint changes counted by setpoint adjuster 1018 can be referred to as variables $n_{x,y}$, where the first subscript x is an integer indicating which time period of day the count is associated with (e.g., 1 for the first time period, 2 for the second time period, etc.), the second subscript y is the day type (e.g., "we" for weekend day type, "wd" for weekday day type, etc.), and the value of n is a sum of setpoint increases or decreases across a corresponding daily time period, with setpoint increases increasing $n_{x,y}$ by some predetermined amount, and setpoint decreases decreasing $n_{x,y}$ by the predetermined amount.

In some embodiments, the counters $n_{x,y,z}$ and/or the counters $n_{x,y}$ are normalized based on a proportion of time duration of day type. For example, if $t_{adj,filtered}$ is collected over a week, and is partitioned/divided according to weekday/weekend day type, the counters can be normalized by a factor of 5/7 or 2/7. Generally, the counters can be normalized according to a proportion of day type time to total time. In the case of a week, the total time duration that $t_{adj,filtered}$ is collected over is 7 days, while the time duration of weekend day type if 2 days, and the time duration of weekday day types if 5 days. Accordingly, the counters can be normalized such as $$\bar{n}_{x,wd,z} = \frac{n_{x,wd,z}}{5} \text{ and } \bar{n}_{x,we,z} = \frac{n_{x,we,z}}{2}.$$

For example, if setpoint adjuster 1018 counts 10 setpoint increases over the second daily time period of a particular weekday, and 5 setpoint decreases over the second daily time period of the particular weekday, then $n_{2,wd,inc}=10$, $n_{2,wd,dec}=2$, and $n_{2,wd,inc}=n_{2,wd,inc}-n_{2,wd,dec}=8$. Setpoint adjuster 1018 can count setpoint increases and decreases cumulatively (e.g., with setpoint increases being a positive value and setpoint decreases being a negative value) or can count setpoint increases and decreases separately.

In some embodiments, setpoint adjuster 1018 compares $n_{x,y,z}$ and/or $n_{x,y}$ to a predetermined threshold value. In some embodiments, the predetermined threshold value is a minimum amount of setpoint changes that trigger setpoint boundary changes. The predetermined threshold value can be the same for setpoint increases and setpoint decreases or can be different for setpoint increases and decreases. In some embodiments, the predetermined threshold value is referred to as $n_{threshold}$ (or $n_{threshold,inc}$ and $n_{threshold,dec}$ if the increase and decrease thresholds are different).

If $n_{x,y,z}$ for a particular daily time period (e.g., the first daily time period) of a particular day type exceeds $n_{threshold}$ of any day of a particular day type, setpoint adjuster 1018 increases both $T_{sp,min,i}$ and $T_{sp,max,i}$ in the direction of the setpoint change, according to some embodiments. For example, if $n_{2,we,inc}$ is greater than (or greater than or equal to) $n_{threshold}$ for any of the days, setpoint adjuster 1018 increases both $T_{sp,min,i}$ and $T_{sp,max,i}$ in the direction of the setpoint changes (e.g., an increase in this example). In some embodiments, setpoint adjuster 1018 increases both $T_{sp,min,i}$ and $T_{sp,max,i}$ in the direction of the setpoint change for all similar day types and time periods.

For example, in the case when the day type is divided according to weekend and weekday and each day is divided into four time periods, setpoint adjuster 1018 can identify if any of the setpoint increases or decreases of any of the first time period of any similar day types exceeds the corresponding threshold values. If $n_{1,wd,inc}$ of any weekdays exceeds $n_{threshold}$, setpoint adjuster 1018 can increase the setpoint boundaries of the first time period of all weekdays (all similar day types) by a predetermined amount. Likewise, if $n_{1,wd,dec}$ exceeds $n_{threshold}$, setpoint adjuster 1018 can decrease the setpoint boundaries of the first time period of all weekdays (all similar day types) by the predetermined amount. If both $n_{1,wd,inc}$ and $n_{1,wd,dec}$ exceed the threshold $n_{threshold}$, the setpoint boundaries are increased or decreased by the predetermined amount in the direction of whichever of $n_{1,wd,inc}$ and $n_{1,wd,dec}$ is greater. If $n_{1,wd,inc}$ and $n_{1,wd,dec}$ are equal to each other, the setpoint boundaries are not changed, according to some embodiments.

Setpoint adjuster 1018 repeats this process for every time period (e.g., the first, second, third, and fourth time period) and for each day type (e.g., weekday and weekend), according to some embodiments. In some embodiments, setpoint adjuster 1018 proceeds to increase or decrease both of the setpoint boundaries $T_{sp,min,i}$ and $T_{sp,max,i}$ the predetermined amount $\Delta T_{sp}$. In some embodiments, the predetermined amount $\Delta T_{sp}$ is one degree Celsius. In this way, the setpoint boundaries can be increased or decreased for similar time periods of similar day types to maintain occupant comfort. When the setpoint boundaries are adjusted, setpoint adjuster 1018 rewrites or redefines the time $t_{sp,adjust}$ as the current time (the time at which the setpoint boundaries are adjusted), according to some embodiments. Setpoint adjuster 1018 can increase or decrease the setpoint boundaries $T_{sp,min,i}$ and $T_{sp,max,i}$ for each daily time period independently (e.g., increasing certain first time periods, but not other first time periods) or can increase/decrease the setpoint boundaries for all of a particular type of time period (e.g., increasing the setpoint boundaries for all of the first time periods).

In some embodiments, the setpoint boundaries (i.e., $T_{sp,min,i}$ and $T_{sp,max,i}$) are adjusted the same amount in the same direction such that an offset (e.g., a delta value) between the setpoint boundaries remains the same. In some embodiments, the setpoint boundaries are adjusted (e.g., increased or decreased) independently such that the offset between the setpoint boundaries changes. For example, $T_{sp,min,i}$ and $T_{sp,max,i}$ can be increased or decrease independently from each other or different amounts (e.g., in different amounts and/or in different directions). For example setpoint adjuster 1018 can determine that the minimum setpoint boundary of a particular daily time period should be increased for weekdays, but that the maximum setpoint boundary of the particular daily time period should be decreased for all weekdays.

In some embodiments, setpoint adjuster 1018 updates the time $t_{sp,adjust}$ with the current time in response to changing or updating setpoint boundaries or the setpoint of room 607. Setpoint adjuster 1018 can then use the updated time $t_{sp,adjust}$ for future iterations and future determinations of setpoint boundary adjustments or setpoint adjustments.

Setpoint adjuster 1018 can provide the adjusted setpoint boundaries (i.e., $T_{sp,min,i}$ and $T_{sp,max,i}$) to feedback controller 1022 and MPC system 630. In some embodiments, MPC system 630 uses the adjusted setpoint boundaries to perform an optimization. For example, MPC system 630 can apply the adjusted setpoint boundaries as constraints to a cost function. MPC system 630 can determine an MPC setpoint for room 607 that minimizes costs but is within the adjusted setpoint boundaries. In some embodiments, MPC system 630 provides the MPC setpoint to feedback controller 1022.

Feedback controller 1022 can use the MPC setpoint and the adjusted setpoint boundaries to operate building equipment 612. In some embodiments, feedback controller 1022 is configured to generate a value of a manipulated variable u based on the adjusted setpoint boundaries and the MPC setpoint. The manipulated variable u can indicate a mode of operation of building equipment 612 (e.g., heating mode, cooling mode, standby, etc.). In some embodiments, feedback controller 1022 provides the value of the manipulated variable u to control signal generator 1024. Feedback controller 1022 can also be configured to receive zone temperature from data collector/aggregator 1010, according to some embodiments. In some embodiments, feedback controller 1022 uses the zone temperature received from data collector/aggregator 1010 as a performance variable y. Feedback controller 1022 can be configured to perform any closed loop feedback control scheme. For example, feedback controller 1022 can use a PI control scheme, a PID control scheme, a self-optimizing control scheme, an extremum seeking control scheme, etc.

Control signal generator 1024 receives the value of the manipulated variable u and generates control signals for building equipment 612 based on the manipulated variable u, according to some embodiments. In some embodiments, control signal generator 1024 provides the control signals to building equipment 612 to operate building equipment 612 to affect an environmental condition or variable state of room 607. In some embodiments, building equipment 612 uses the control signals to provide heating or cooling to room 607 to affect a temperature in room 607.

Referring still to FIG. 10, setpoint adjuster 1018 can be configured to adjust the setpoint boundaries independently. In some embodiments, the setpoint boundaries (i.e., $T_{sp,min,i}$ and $T_{sp,max,i}$) as described in greater detail above are setpoint boundaries used by MPC system 630 to perform cost optimization. In some embodiments, setpoint adjuster 1018 defines new setpoint boundaries and adjusts the new setpoint boundaries. In some embodiments, the new setpoint boundaries (e.g., the new minimum and maximum allowable temperature boundaries) are used by setpoint adjuster 1018 to ensure that the MPC setpoint boundaries (e.g., $T_{sp,min,i}$ and $T_{sp,max,i}$) are maintained within these adjusted boundaries.

Setpoint adjuster 1018 can use any of the techniques, functionality, methods, processes, approaches, etc., described in greater detail above to adjust the new boundaries. For each time period, if any of the number of setpoint increases or the number of setpoint decreases exceeds the corresponding threshold, setpoint adjuster 1018 adjusts/offsets one of the new setpoint boundaries in the direction of occupant adjustments (e.g., setpoint adjuster 1018 increases one of the new setpoint boundaries by 1 degree Celsius in response to the number of setpoint increases exceeding the corresponding threshold value or decreases one of the new setpoint boundaries by 1 degree Celsius in response to the number of setpoint decreases exceeding the corresponding threshold value). If the number of setpoint increases and decreases (e.g., as adjusted by the occupants) are equal, setpoint adjuster 1018 does not change the new setpoint boundaries, according to some embodiments.

In some embodiments, setpoint adjuster 1018 increases or decreases one of the new setpoint boundaries based on a mode of operation of building equipment 712. For example, if building equipment 712 is in a heating mode of operation, setpoint adjuster 1018 can determine to increase/decrease an upper one of the new setpoint boundaries while if building equipment is in a cooling mode of operation, setpoint adjuster 1018 can determine to increase/decrease a lower one of the new setpoint boundaries, or vice versa.

In some embodiments, setpoint adjuster 1018 increases or decreases a difference between the new setpoint boundaries. For example, setpoint adjuster 1018 may increase the upper one of the new setpoint boundaries by some amount while decreasing the lower one of the new setpoint boundaries by the same amount. In some embodiments, setpoint adjuster 1018 decreases the upper one of the new setpoint boundaries while increasing the lower one of the new setpoint boundaries.

If any of the changes to the new setpoint boundaries results in a difference between the upper and lower of the new setpoint boundaries being less a predetermined threshold (e.g., 2 degrees Celsius, which may be specified as an internal parameter), then setpoint adjuster 1018 can increase or decrease the lower one or the upper one of the new setpoint boundaries to maintain the predetermined threshold, depending on which of the lower or upper one of the new setpoint boundaries are currently being adjusted.

Advantageously, using separate setpoint boundaries for comfort and MPC system 630 enables the occupants to specify setpoint boundary patterns while also allowing setpoint adjustment controller 604 to adjust the setpoint boundaries to maintain the user specified setpoint boundary pattern. Using the new setpoint boundaries, the MPC setpoint boundaries (e.g., and $T_{sp,min,i}$ and $T_{sp,max,i}$) can be adjusted by setpoint adjuster 1018.

If the lower/minimum of the new setpoint boundaries exceeds the minimum MPC setpoint boundary (i.e., setpoint adjuster 1018 can increase the minimum MPC setpoint boundary (i.e., to be equal to the lower/minimum of the new setpoint boundaries. At the same time, setpoint adjuster 1018 can increase the maximum MPC setpoint boundary (i.e., $T_{sp,max,i}$) to the smaller of (1) the maximum MPC setpoint boundary (e.g., $T_{sp,max,i}$) plus the amount that the minimum MPC setpoint boundary is increased, or (2) the maximum/upper of the new setpoint boundaries.

If the upper/maximum of the new setpoint boundaries exceeds the maximum MPC setpoint boundary (i.e., $T_{sp,max,i}$), setpoint adjuster 1018 can decrease the maximum MPC setpoint boundary to be equal to the upper/maximum of the new setpoint boundaries. At the same time, setpoint adjuster 1018 can decrease the minimum MPC setpoint boundary (i.e., $T_{sp,min,i}$) to the larger of (1) the minimum MPC setpoint boundary (i.e., $T_{sp,min,i}$) minus the amount that the maximum MPC setpoint boundary is increased or (2) the minimum/lower of the new setpoint boundaries.

Setpoint adjuster 1018 can adjust the MPC setpoint boundaries using the techniques described hereinabove and provide MPC system 630 with the adjusted/updated MPC setpoint boundaries (e.g., $T_{sp,min,i}$ and $T_{sp,max,i}$).

In some embodiments, setpoint adjuster 1018 is configured to partition occupant setpoint adjustment data (e.g., the filtered setpoint data) into time period bins (e.g., daily time periods and day types). In some embodiments, each bin is specific to a particular day type (e.g., a weekend day type, a weekday day type, etc.) as well as a particular daily time period within that day type (e.g., from 9 AM to 10 AM). In some embodiments, the occupant comfort data collected during corresponding daily time periods on days having a corresponding or same day type are sorted into the same time period bin. In some embodiments, setpoint adjuster 1018 partitions, sorts, divides, etc., the setpoint data and/or the filtered setpoint data into bins using any of the techniques described herein, or using any of the techniques described in greater detail with reference to U.S. application Ser. No. 13/439,779, filed Apr. 4, 2012, now U.S. Pat. No. 9,606,520, the entire disclosure of which is incorporated herein by reference. Setpoint adjuster 1018 can adjust the setpoint, setpoint boundaries, new setpoint boundaries, etc., for common time period bins. For example, in response to the number of occupant setpoint adjustments/overrides exceeding a corresponding threshold value for a particular time period bin, setpoint adjuster 1018 can increase or decrease the setpoint boundaries for all other time period bins that share a common time attribute (e.g., a same day type and/or a same daily time period).

Sample Graphs

Figure 11:
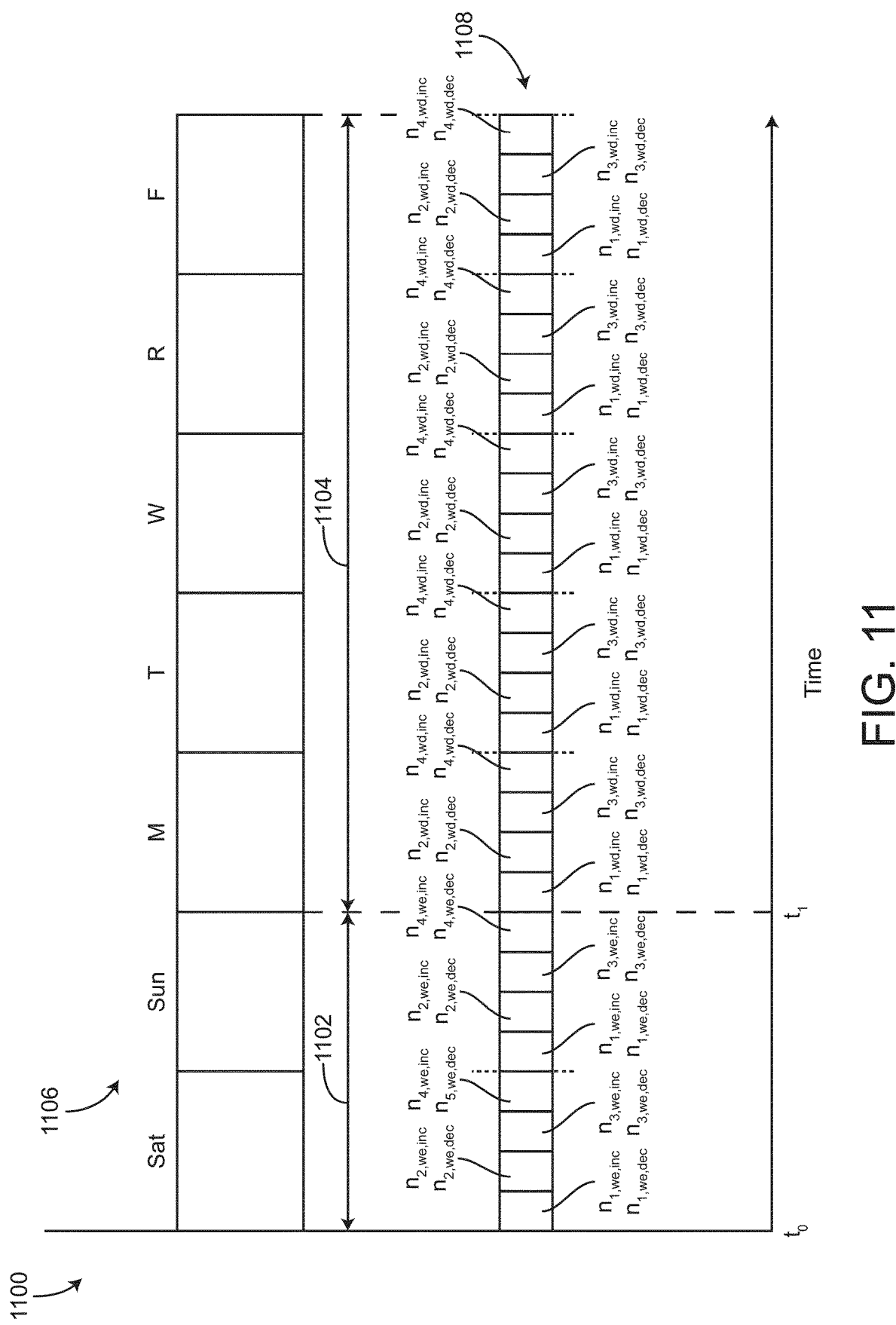
FIG. 11 is a graph showing day types, daily time periods, and setpoint adjustment counters of the setpoint adjustment controller of FIG. 10, according to some embodiments.

Referring now to FIG. 11, a graph 1100 illustrates the various time periods over which setpoint adjuster 1018 can count occupant initiated setpoint adjustments, according to some embodiments. Graph 1100 shows a weekend time interval 1102 and a weekday time interval 1104. Weekend time interval 1102 includes two days (i.e., Saturday and Sunday), according to some embodiments. Weekday time interval 1104 includes five days (i.e., Monday, Tuesday, Wednesday, Thursday, and Friday), according to some embodiments. Weekend time interval 1102 includes weekend day types ("we"), while weekday time interval 1104 includes weekday day types ("wd"). Each day of weekend time interval 1102 and weekday time interval 1104 can be divided or partitioned into a predetermined number of daily time periods. For example, graph 1100 shows each day of both weekend time interval 1102 and weekday time interval 1104 being divided or partitioned into four daily time periods.

Setpoint adjuster 1018 is configured to count the number of occupant initiated increases or decreases of the setpoint that indicate discomfort for each daily time period of each day type. For example, setpoint adjuster 1018 can generate the counters $n_{x,y,z}$, as shown in FIG. 11 for each daily time period of each day type. Setpoint adjuster 1018 can adjust the setpoint boundaries (e.g., the MPC setpoint boundaries or the new setpoint boundaries) in response to the counters exceeding a predetermined threshold value.

For example, setpoint adjuster 1018 may count 5 setpoint increases over the first time period of Saturday (i.e., $n_{1,we,inc}=5$) that indicate occupant discomfort. In response to counting 5 setpoint increases over the first time period of Saturday that indicate occupant discomfort (if the threshold/trigger value is less than 5), setpoint adjuster 1018 may (1) adjust setpoint boundaries associated with the first daily time period of all weekend day types, (2) adjust setpoint boundaries associated with the first daily time period of all days (both weekday and weekend type days), or (3) adjust setpoint boundaries associated with any time period of a weekend day type. Likewise, if setpoint adjuster 1018 counts 10 setpoint increases over the second time period of Tuesday (i.e., $n_{2,wd,dec}$) that indicate occupant discomfort, and the threshold/trigger value is less than 10, setpoint adjuster 1018 may adjust setpoint boundaries associated with all of the second daily time periods of weekday type days.

In some embodiments, setpoint adjuster 1018 adjusts setpoint boundaries in response to at least one of the counters for a particular time period of a particular day type exceeding the threshold value. If the occupant setpoint changes result in contradictory setpoint adjustments (e.g., if one of the counters $n_{3,wd,dec}=10$ and one of the counters $n_{3,wd,inc}=10$ where the trigger/threshold value is 10 or less), setpoint adjuster 1018 can change the definition of day types (e.g., increase the granularity of day types). For example, in this case, setpoint adjuster 1018 may increase the granularity of day types so that every day of the week is a day type (e.g., seven day types).

Figure 12:
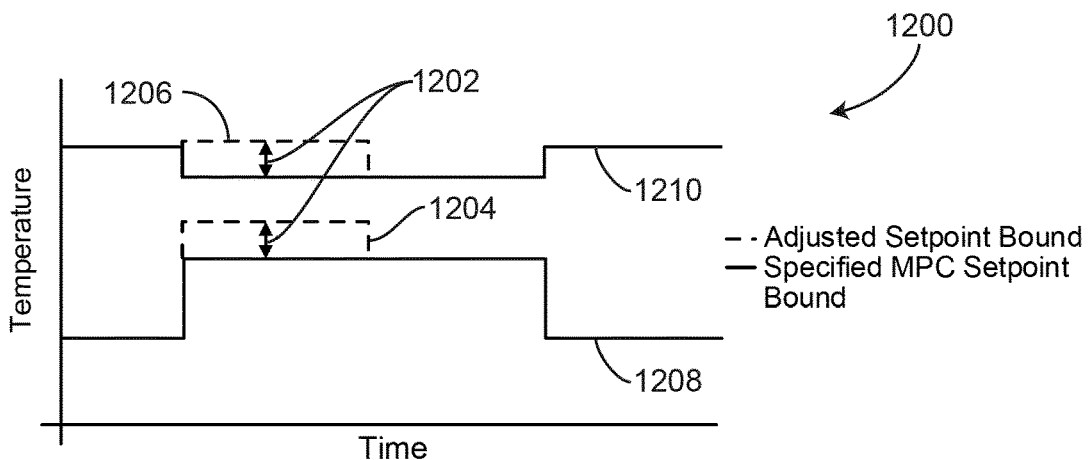
FIG. 12 is a graph of an offset based approach to adjust an allowable setpoint range, according to some embodiments.

Referring now to FIG. 12, a graph 1200 showing temperature setpoint over time includes series 1208 and series 1210. Series 1208 represents $T_{sp,min,i}$ and series 1210 represents according to some embodiments. As shown in graph 1200, both $T_{sp,min,i}$ and $T_{sp,max,i}$ are adjusted (e.g., increased) by an offset amount 1202. Setpoint adjuster 1018 can adjust (e.g., increase or decrease by offset amount 1202) both $T_{sp,min,i}$ and $T_{sp,max,i}$ in response to the number of occupant setpoint changes indicating occupant discomfort and exceeding a corresponding threshold value.

Figure 13:
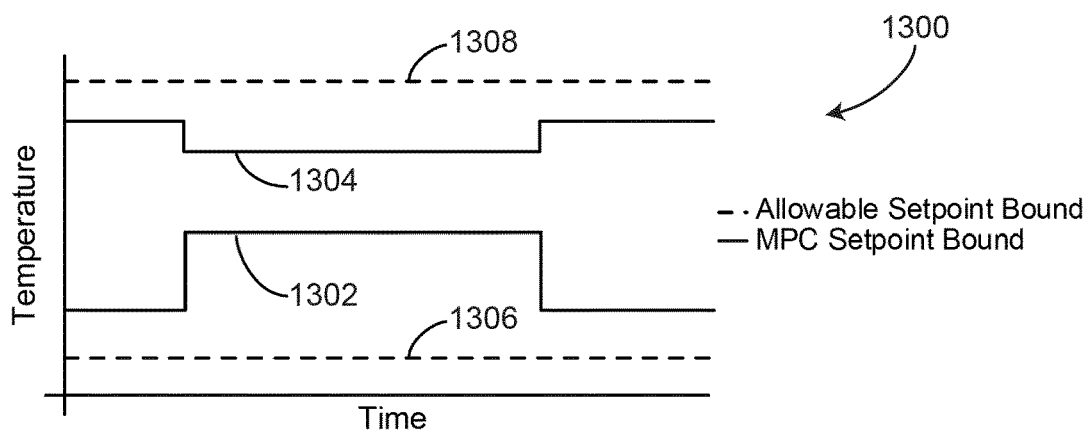
FIGS. 13-14 are graphs showing a minimum and maximum allowable setpoint boundary adjustment approach to adjust setpoint boundaries, according to some embodiments.
Figure 14:
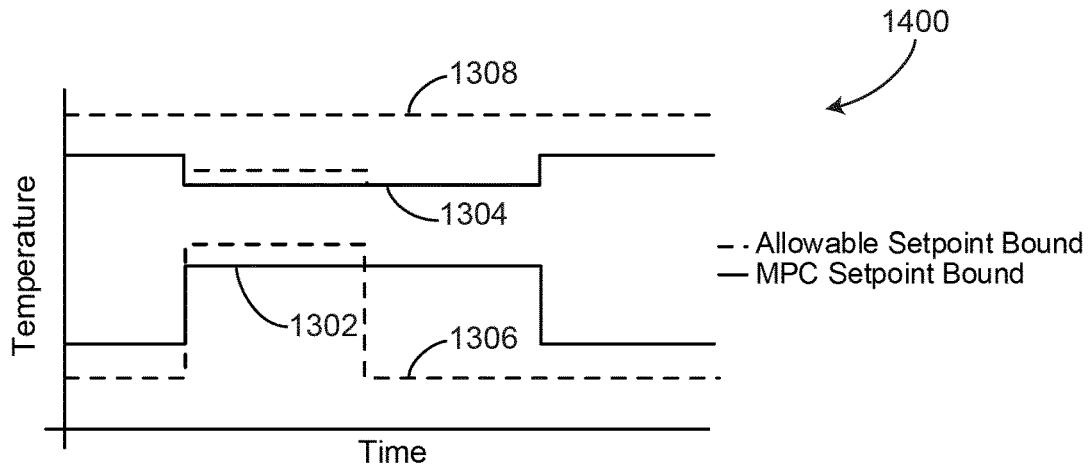

Referring now to FIGS. 13-14, graphs 1300 and 1400 show how setpoint adjustment controller 604 can adjust MPC setpoint boundaries 1302 and 1304 over time, according to some embodiments. In graph 1300, minimum and maximum allowable setpoint boundaries 1306 and 1308 are outside of MPC boundaries 1302 and 1304, and therefore setpoint adjustment controller 604 does not adjust MPC boundaries 1302 and 1304. Setpoint adjustment controller 604 can adjust minimum setpoint boundary 1306 and maximum setpoint boundary 1308 until minimum setpoint boundary 1306 is greater than minimum MPC boundary 1302 and/or until maximum setpoint boundary 1308 is less than maximum MPC boundary 1304. In graph 1400, during one time period, minimum setpoint boundary 1306 exceeds minimum MPC boundary 1302, and therefore MPC boundaries 1302 and 1304 are adjusted using any of the techniques, methods, approaches, etc., described in greater detail above with reference to FIG. 10.

Figure 15:
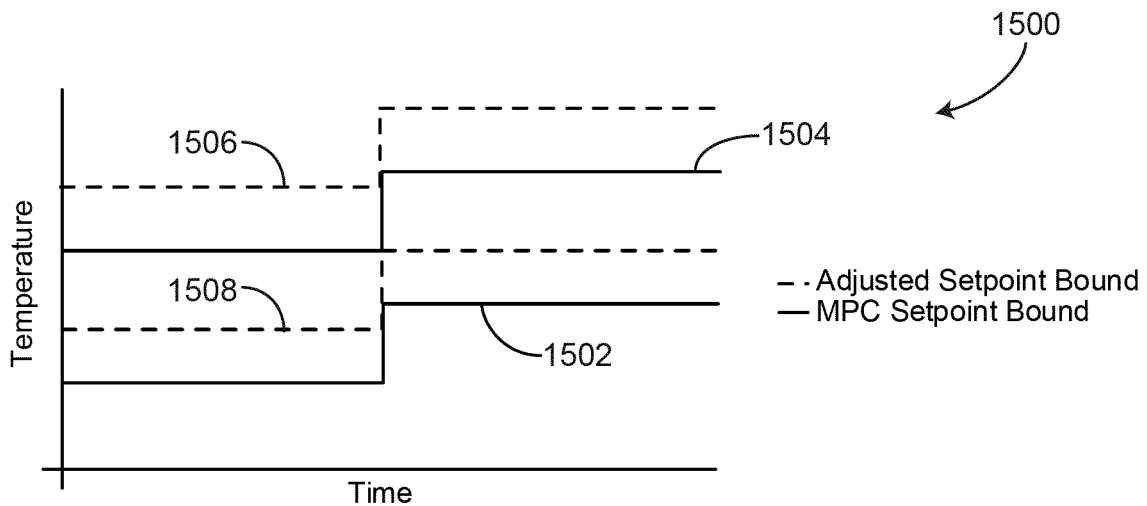
FIG. 15 is a graph of the offset based approach of FIG. 12 to adjust the allowable setpoint range, according to some embodiments.
Figure 16:
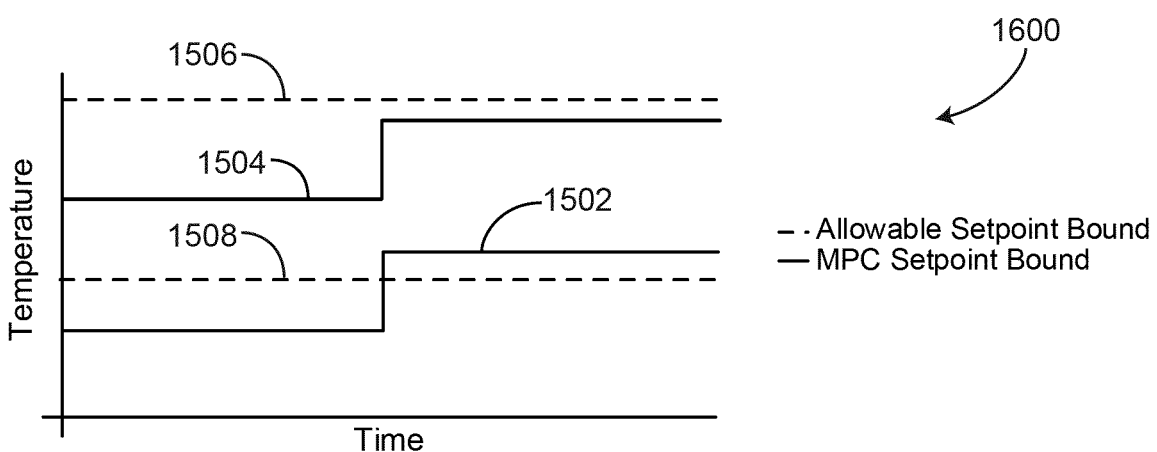
FIG. 16 is a graph of the maximum and minimum allowable setpoint boundary adjustment approach of FIGS. 13-14 for the same conditions of FIG. 15, according to some embodiments.

Referring now to FIGS. 15 and 16, graphs 1500 and 1600 show the differences between an offset based approach (e.g., by simply offsetting the minimum and maximum setpoint boundaries) and a minimum/maximum allowable setpoint approach that setpoint adjuster 1018 can use, according to some embodiments. Graph 1500 includes minimum MPC setpoint boundary 1502 and maximum MPC setpoint boundary 1504, according to some embodiments. Graph 1500 also includes adjusted minimum MPC setpoint boundary 1508 and adjusted maximum MPC setpoint boundary 1506. Setpoint adjuster 1018 can adjust minimum MPC setpoint boundary 1502 and maximum MPC setpoint boundary 1504 by offsetting boundaries 1502 and 1504 a predetermined amount (e.g., 1 degree Celsius) to account for occupant setpoint changes. Advantageously, adjusting boundaries 1502 and 1504 facilitates maintaining occupant comfort and tailoring MPC system 630 to occupant preferences.

Setpoint Adjustment Processes

Figure 17:
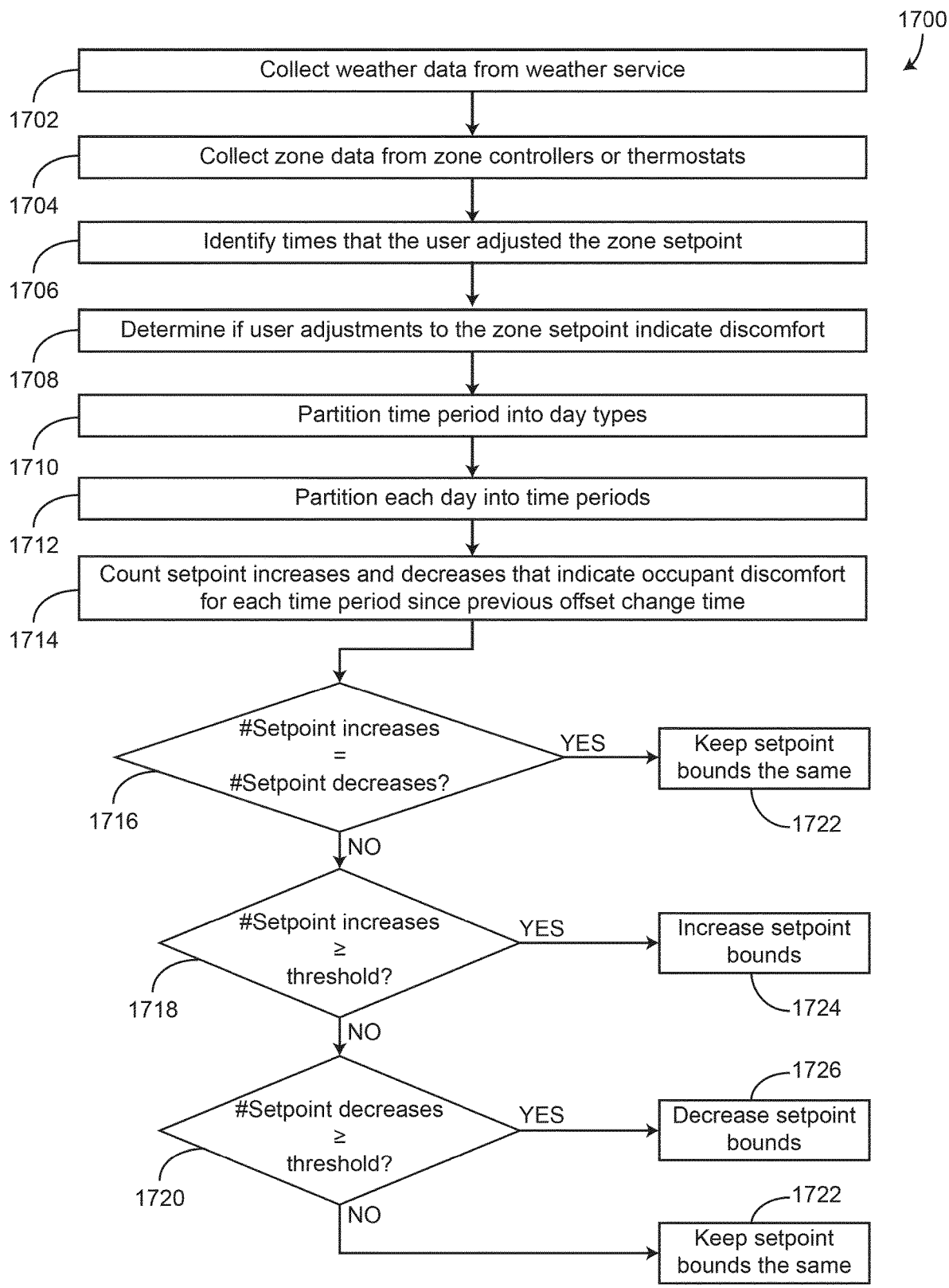
FIG. 17 is a flow diagram of a process for automatically adjusting the setpoint boundaries for a room, according to some embodiments.

Referring now to FIG. 17, a process 1700 for adjusting setpoint boundaries based on occupant setpoint overrides is shown. Process 1700 includes steps 1702-1728. Process 1700 can be performed by setpoint adjustment controller 604. Process 1700 can be performed to increase or decrease setpoint boundaries to maintain occupant comfort within a space.

Process 1700 includes collecting weather data from a weather service (step 1702), according to some embodiments. The weather data can include any of relative humidity, outside temperature, outside air temperature, solar irradiance, cloud cover, etc. The weather data can be collected from a weather service (e.g., weather service 902), or from sensors. In some embodiments, historical weather data is collected. In some embodiments, step 1702 is performed by data collector/aggregator 1010.

Process 1700 includes collecting zone data from zone controllers or thermostats (step 1704), according to some embodiments. In some embodiments, the zone data includes any of temperature setpoints, setpoint adjustments, zone temperature, mode of operation of building equipment, etc. Step 1704 can be performed by data collector/aggregator 1010. In some embodiments, the zone data collected from the zone controllers or thermostats is historical data. In some embodiments, the zone data is collected from thermostats 622.

Process 1700 includes identifying times that the occupant adjusted the zone setpoint (step 1706), according to some embodiments. In some embodiments, the times at which the occupant adjusted the zone setpoint are determined based on the zone setpoint data received in step 1704. Step 1706 can include determining if the occupant increased or decreased the zone setpoint, according to some embodiments. In some embodiments, step 1706 is performed by occupant adjustment identifier 1012 using any of the techniques, functionality, methods, approaches, etc., described in greater detail above with reference to FIG. 10.

Process 1700 includes determining if the occupant adjustments to the zone setpoint indicate occupant discomfort (step 1708), according to some embodiments. In some embodiments, step 1708 is performed by occupant adjustment manager 1020 using any of the techniques, functionality, etc., described in greater detail above with reference to FIG. 10. In some embodiments, step 1708 includes filtering the zone setpoint data by removing occupant adjustments that dot not indicate occupant discomfort. In some embodiments, step 1708 includes identifying occupant setpoint adjustments/overrides that indicate occupant discomfort and removing other occupant setpoint adjustments/overrides that do not indicate occupant discomfort.

Process 1700 includes partitioning a time period into day types (step 1710), according to some embodiments. In some embodiments, the time period is time duration of the filtered setpoint data that does not include occupant setpoint changes that do not indicate occupant discomfort. In some embodiments, the occupant setpoint changes/overrides of step 1710 are partitioned into day types. The day types can include any of weekday and weekend, day of the week, holidays, occupant schedules, etc. In some embodiments, step 1710 is performed by subset manager 1016.

Process 1700 includes partitioning each day of into time periods (step 1712), according to some embodiments. The filtered setpoint data can be further partitioned into daily time periods. For example, the filtered setpoint data can be partitioned into four daily time periods. In some embodiments, the daily time periods have a same time duration. In other embodiments, some of the daily time periods are longer or shorter than each other. Step 1712 can be performed by subset manager 1016. The occupant overrides can be filtered into the daily time periods by subset manager 1016.

Process 1700 includes counting setpoint increases and decreases that indicate occupant discomfort for each time period of each day type since a previous offset change time (step 1714), according to some embodiments. Step 1714 can include counting setpoint increases and setpoint decreases independently (e.g., with separate counters). Step 1714 can include counting the setpoint increases and decreases for each daily time period of each day type. Step 1714 can be performed by setpoint adjuster 1018.

Process 1700 includes determining if a number of setpoint increases is equal to a number of setpoint decreases (step 1716), according to some embodiments. Step 1716 can be performed for each daily time period of each day type. For example, step 1716 can be performed four times for each day of each day type (if four daily time periods are used). Step 1716 can be performed by setpoint adjuster 1018.

In response to the number of setpoint increases being equal to the number of setpoint decreases (step 1716, "YES"), process 1700 proceeds to keeping setpoint boundaries the same (step 1722), according to some embodiments. In some embodiments, steps 1716 and 1722 are performed for each daily time period of each day of each day type. In some embodiments, if all of the setpoint increases and decreases are equal for a particular daily time period of a particular day type (step 1716, "YES"), process 1700 proceeds to step 1722. In some embodiments, step 1722 is performed by setpoint adjuster 1018.

Process 1700 includes checking if the number of setpoint increases is greater than a threshold (step 1718), according to some embodiments. In some embodiments, step 1718 is performed concurrently with step 1716. In some embodiment, step 1718 is performed in response to the number of setpoint increases not being equal to the number of setpoint decreases (step 1716, "NO"). In some embodiments, step 1718 is performed by setpoint adjuster 1018. In some embodiments, step 1718 is performed for each daily time period of each day of each day type. In some embodiments, if any of the number of setpoint increases of any daily time period of one or more days of a particular day type exceeds the threshold value (step 1718, "YES"), process 1700 proceeds to step 1724.

Process 1700 includes increasing setpoint boundaries for a specific daily time period of a specific day type (step 1724) in response to the number of setpoint increases exceeding the threshold value (step 1718, "YES"), according to some embodiments. In some embodiments, step 1724 includes increasing both minimum and maximum setpoint boundaries for all similar daily time periods of a particular day type in response to one or more of the number of setpoint increases for a similar daily time period exceeding the threshold value. For example, if the number of setpoint increases of one or more of the first daily time periods of a weekday day type exceed the threshold value (step 1718, "YES"), step 1724 can include increasing the setpoint boundaries (e.g., both the minimum and the maximum setpoint boundaries) of all the first daily time periods of weekday day types by a predetermined amount. In some embodiments, step 1724 is performed by setpoint adjuster 1018.

Process 1700 includes checking if the number of setpoint decreases is greater than a threshold (step 1720), according to some embodiments. In some embodiments, the threshold of step 1720 is the same as the threshold of step 1718. In some embodiments, the threshold of step 1720 is greater than or less than the threshold of step 1718. Step 1720 can be performed concurrently with step 1718. In some embodiments, step 1720 is performed by setpoint adjuster 1018. In some embodiments, if the number of setpoint decreases are greater than the threshold for any daily time periods of any days of a particular day type (step 1720, "YES"), process 1700 proceeds to step 1722.

Process 1700 includes decreasing the setpoint boundaries (step 1726) in response to the number of setpoint decreases exceeding the threshold (step 1720, "YES"), according to some embodiments. In some embodiments, both the minimum and the maximum setpoint boundaries are decreased in response to the number of setpoint decreases exceeding the threshold. In some embodiments, step 1726 includes decreasing the setpoint boundaries for a corresponding daily time period. For example, if the number of setpoint decreases for a second daily time period of a weekend day type exceeds the threshold (step 1720, "YES"), step 1726 can include decreasing the setpoint boundaries of the second daily time period for all weekend day types.

Process 1700 includes keeping the setpoint boundaries the same (step 1722) in response to the number of setpoint decreases not exceeding the threshold (step 1720, "NO"), according to some embodiments. In some embodiments, step 1722 is performed for each daily time period of each day type in response to the number of setpoint increases/decreases being less than the corresponding threshold. For example, if the setpoint increases and decreases of all of the third daily time periods of weekday day types are less than the corresponding threshold values, process 1700 can proceed to step 1722 and may keep the setpoint boundaries the same.

In some embodiments, process 1700 includes updating the previous offset change time with a current time in response to adjusting (e.g., increasing or decreasing) the setpoint boundaries. Specifically, process 1700 can include updating the previous offset change time with the current time in response to performing step 1724 or step 1726. In some embodiments, steps 1724 and 1726 include increasing or decreasing the setpoint boundaries by a predetermined amount (e.g., 1 degree Celsius).

Process 1700 can be performed by setpoint adjustment controller 604 to adjust or tailor the setpoint boundaries to occupant preferences. In some embodiments, the setpoint boundaries are used to control equipment to adjust or affect an environmental condition of an occupied space. In some embodiments, the setpoint boundaries are provided to and used by MPC system 630. If the number of setpoint increases and the number of setpoint decreases for a particular daily time period both exceed the corresponding thresholds (e.g., steps 1718 and 1720, "YES"), the setpoint boundaries can be increased or decreased based on whether the setpoint was increased or decreased more frequently. For example, if both the number of setpoint increases and the number of setpoint decreases exceed the threshold value, but the number of setpoint increases is greater than the number of setpoint decreases, process 1700 can proceed to step 1724. Likewise, if both the number of setpoint increases and the number of setpoint decreases exceed the corresponding threshold values, but the number of setpoint decreases is greater than the number of setpoint increases, process 1700 can proceed to step 1726.

Figure 18A:
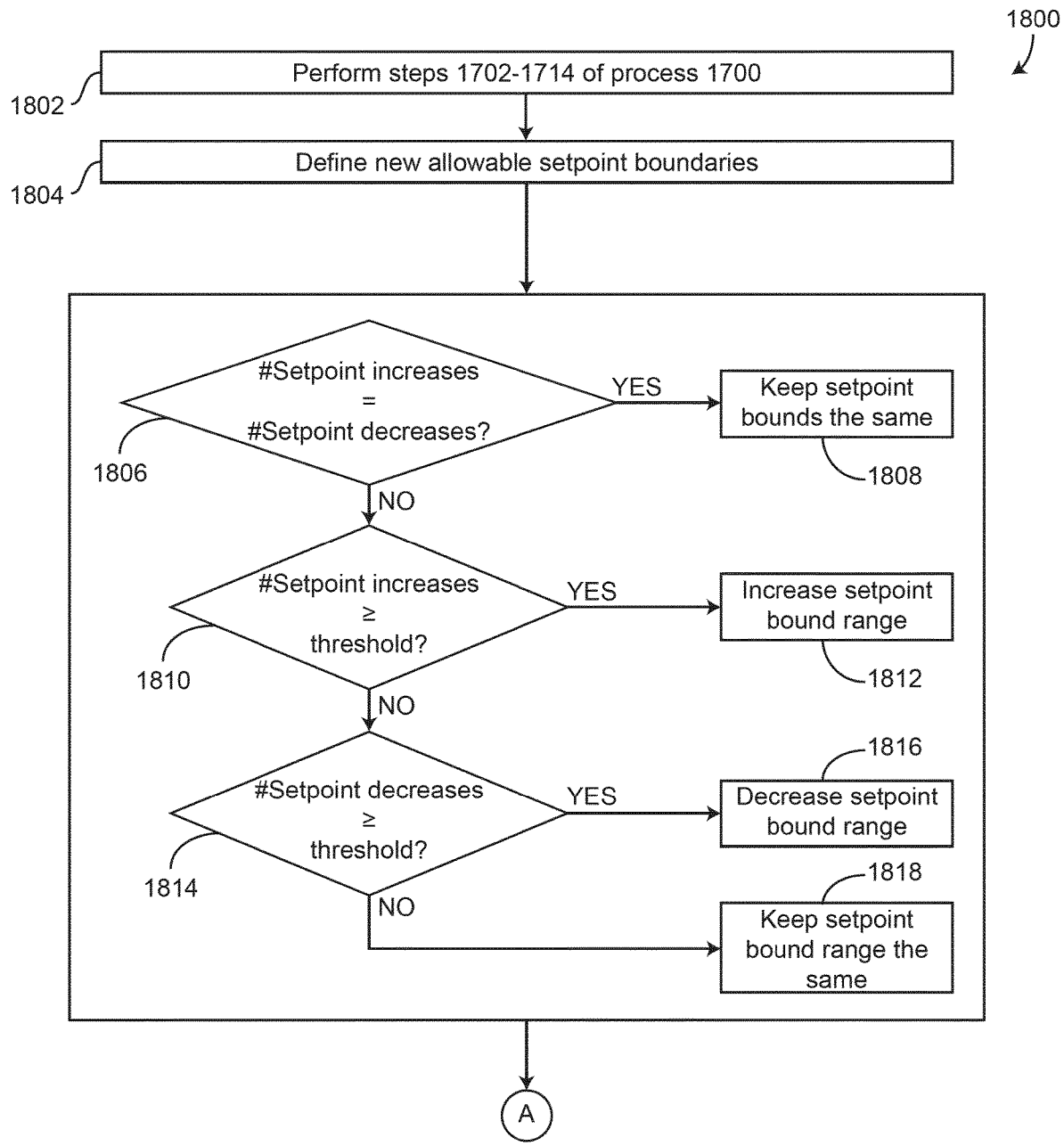
FIG. 18A is a flow diagram of a process for automatically adjusting the setpoint boundaries for a room, according to some embodiments.
Figure 18B:
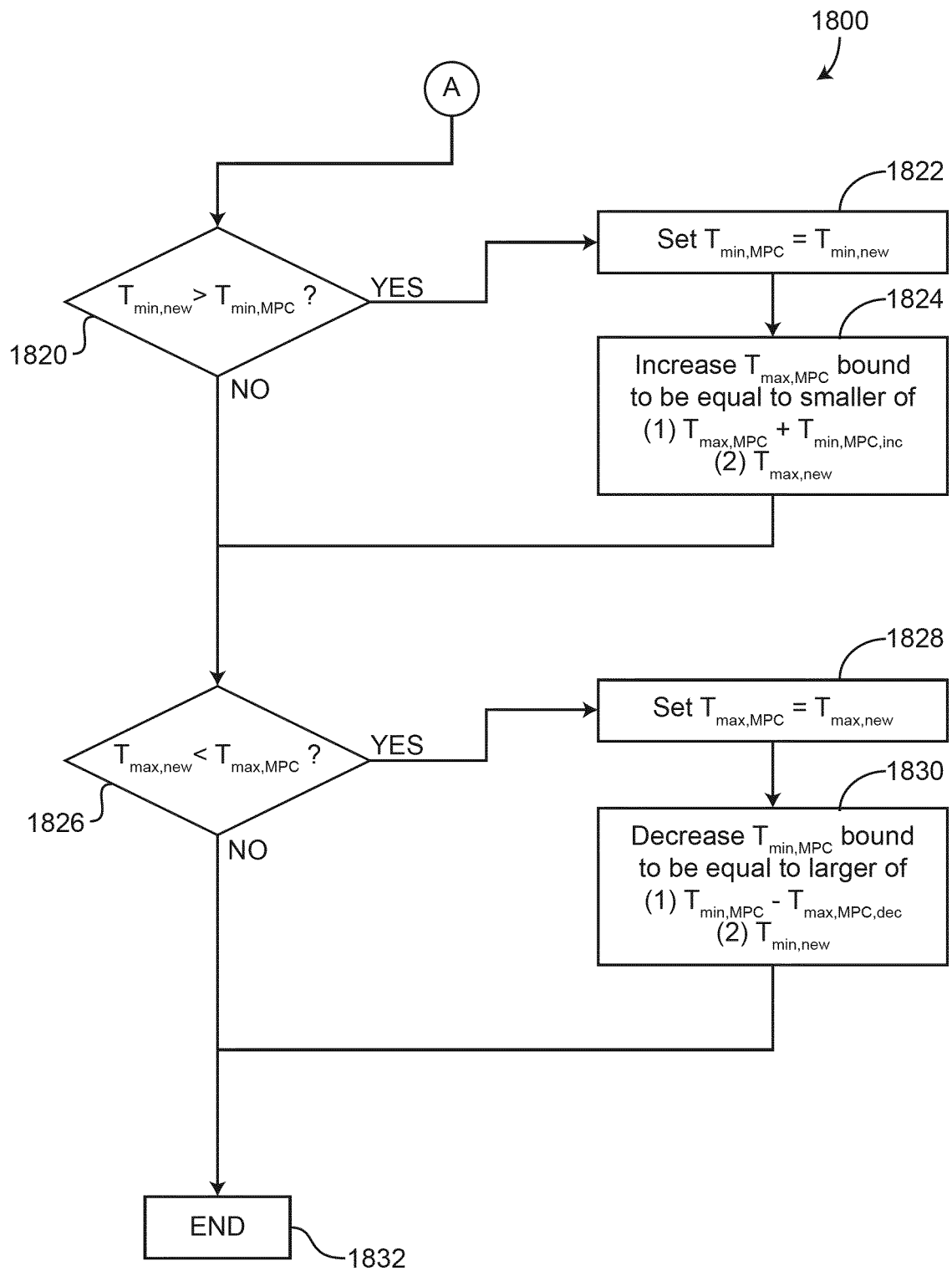
FIG. 18B is a flow diagram continuing the process of FIG. 18A for automatically adjusting the setpoint boundaries for the room, according to some embodiments.

Referring now to FIGS. 18A-18B, a process 1800 for adjusting setpoint boundaries is shown. Process 1800 includes steps 1802-1832, according to some embodiments. In some embodiments, process 1800 includes steps that are the same as or similar to steps in process 1700. Process 1800 can be performed by setpoint adjustment controller 604.

Process 1800 includes performing steps 1702-1714 or process 1700 (step 1802), according to some embodiments. In some embodiments, steps 1702-1714 of process 1700 are performed to identify, partition, and count setpoint adjustments (e.g., increases or decreases) that are occupant initiated.

Process 1800 includes defining new allowable setpoint boundaries (step 1804), according to some embodiments. In some embodiments, the new allowable setpoint boundaries are defined by an occupant or by an occupant's preferred schedule. In some embodiments, step 1804 includes defining $T_{min,new}$ and $T_{max,new}$. In some embodiments, the new minimum and maximum boundaries are used by setpoint adjustment controller 604 to maintain occupant comfort. In some embodiments, the new minimum and maximum boundaries are used to operate building equipment configured to affect an environmental condition of an occupied space. Boundaries used by MPC system 630 can be referred to as $T_{min,MPC}$ and $T_{max,MPC}$. In some embodiments, step 1804 is performed by setpoint adjuster 1018.

Process 1800 includes steps 1806-1818, according to some embodiments. In some embodiments, steps 1806-1818 are the same as or similar to steps 1716-1722 of process 1700. In some embodiments, process 1800 performs some or all of steps 1806-1810 concurrently. In some embodiments, process 1800 performs steps 1806, 1810, and 1814 concurrently.

Process 1800 includes determining/checking if the number of setpoint increases is equal to the number of setpoint decreases (step 1806), according to some embodiments. In some embodiments, step 1806 is the same as or similar to step 1716. If the number of setpoint increases are equal to the number of setpoint decreases for a particular daily time period of a particular day type (step 1806, "YES"), process 1800 proceeds to step 1808 and keeps the new allowable setpoint boundaries the same.

Process 1800 includes determining if the number of setpoint increases is greater than a corresponding threshold (step 1810), according to some embodiments. In some embodiments, step 1810 is the same as or similar to step 1716 of process 1700. If the number of setpoint increases exceeds the corresponding threshold (step 1810, "YES"), process 1800 proceeds to step 1812, according to some embodiments. Process 1800 includes increasing a setpoint boundary range between $T_{min,new}$ and $T_{max,new}$ (step 1812) in response to determining that the number of setpoint increases exceeds or is equal to the corresponding threshold value (step 1810, "YES"), according to some embodiments. In some embodiments, one of the new allowable setpoint boundaries is increased (e.g., only $T_{min,new}$ or $T_{max,new}$ is increased). In some embodiments, the new allowable setpoint boundaries are increased independently from each other. In some embodiments, the new allowable setpoint boundaries are increased (or decreased in step 1816) a predetermined amount (e.g., by 1 degree Celsius).

Process 1800 includes determining if the number of setpoint decreases exceeds a corresponding threshold value (step 1814), according to some embodiments. In some embodiments, step 1814 is the same as or similar to step 1720 of process 1700. In some embodiments, if the number of setpoint decreases exceeds the corresponding threshold value (step 1814, "YES"), process 1800 proceeds to step 1816. Process 1800 includes decreasing the setpoint boundary range (e.g., decreasing one or both of $T_{min,new}$ or $T_{max,new}$, step 1816) in response to the number of setpoint decreases exceeding the corresponding threshold value (step 1814, "YES"). Process 1800 includes keeping the setpoint boundary range the same (step 1818) in response to the number of setpoint decreases not exceeding (e.g., being less than) the corresponding threshold value (step 1814, "NO"), according to some embodiments.

In response to performing steps 1806-1818, process 1800 proceeds to determining if the new minimum setpoint boundary $T_{min,new}$ is greater than $T_{min,MPC}$ (step 1820), according to some embodiments. In some embodiments, if the new minimum setpoint boundary $T_{min,new}$ is greater than $T_{min,MPC}$ (step 1820, "YES"), process 1800 proceeds to step 1822. If the new minimum setpoint boundary $T_{min,new}$ is less than $T_{min,MPC}$, process 1800 proceeds to step 1826.

Process 1800 includes setting or increasing $T_{min,MPC}$ to be equal to $T_{min,new}$ (step 1822), according to some embodiments. In some embodiments, step 1822 is performed in response to the new minimum setpoint boundary $T_{min,new}$ being greater than $T_{min,MPC}$ (step 1820, "YES"). Process 1800 also includes increasing $T_{max,MPC}$ to be equal to the smaller of (1) $T_{max,MPC}+T_{min,MPC,inc}$ or (2) $T_{max,new}$ (step 1824), where $T_{min,MPC,inc}$ is the amount that $T_{min,MPC}$ was increased to be equal to $T_{min,new}$ in step 1822, according to some embodiments. In some embodiments, step 1824 is performed in response to step 1822.

In some embodiments, process 1800 proceeds to step 1826 in response to performing step 1824, or in response to the new minimum setpoint boundary $T_{min,new}$ being less than $T_{min,MPC}$ (step 1820, "NO"). Step 1826 includes determining if the new maximum allowable setpoint boundary $T_{max,new}$ is less than $T_{max,MPC}$, according to some embodiments. In some embodiments, if $T_{max,new}$ is less than $T_{max,MPC}$ (step 1826, "YES"), process 1800 proceeds to step 1828. In some embodiments, if $T_{max,new}$ is not less than $T_{max,MPC}$ (e.g., is greater than, is greater than or equal to, etc., step 1826 "NO"), process 1800 proceeds to step 1832 and ends.

Process 1800 includes setting or decreasing $T_{max,MPC}$ to be equal to $T_{max,new}$ (step 1828) in response to $T_{max,MPC}$ being greater than $T_{max,new}$ (step 1826, "YES"), according to some embodiments. In some embodiments, process 1800 proceeds to step 1830 in response to performing step 1828. Step 1830 includes decreasing $T_{min,MPC}$ to be equal to the larger of (1) $T_{min,MPC}-T_{max,MPC,dec}$ or (2) $T_{min,new}$ where $T_{max,MPC,dec}$ is the amount that $T_{max,MPC}$ was decreased in step 1828 to be equal to $T_{max,new}$. In response to performing step 1830, process 1800 proceeds to step 1832 and ends. In some embodiments, steps 1820-1830 are performed by setpoint adjuster 1018.

System Identification

Referring again to FIG. 10, setpoint adjustment controller 604 can be configured to perform a system identification experiment. Since setpoint adjustment controller 604 is configured to adjust setpoint boundaries, setpoints, etc., setpoint adjustment controller 604 can also be extended to adjust minimum and maximum temperature setpoint boundaries during a system identification experiment. System identification experiments are often executed during periods when a corresponding building (e.g., building 10), room, space, zone, area, etc., is unoccupied, which allows a wide range of temperature values to be considered (e.g., by setpoint adjustment controller 604). One goal of the system identification experiment is to provide a rich data set of training data to a system identification algorithm (e.g., that is performed by setpoint adjustment controller 604 or performed cooperatively with setpoint adjustment controller 604), which indicates that HVAC equipment (e.g., building equipment 612) is providing/removing sensible heat to/from the building. The training data is most useful if it captures a range of conditions of the HVAC equipment and the building space and demonstrates the temperature dynamics of the space in response to heating/cooling provided by the HVAC equipment. Therefore, it may be beneficial to operate the HVAC equipment to ensure that the building space is in a transient state (i.e., heating or cooling active) in order to best capture the temperature dynamics.

To ensure that a rich set of training data is generated for the system identification experiment, any of the functionality of setpoint adjustment controller 604 can be used to adjust temperature setpoints of the building or room during the system identification experiment to ensure that the HVAC system is providing heating/cooling to the building/space. In other words, the temperature setpoints can be artificially adjusted as part of the system identification experiment to ensure that the HVAC equipment are active and the temperature of the space is changing in order to capture system dynamics. Specifically, using the same data associated with the minimum and maximum allowable temperature-based approach (described in greater detail above with reference to FIGS. 10 and 18A-18B), setpoint adjustment controller 604 can be modified to also input HVAC heating and/or cooling loads.

Setpoint adjustment controller 604 can then determine if there is a significant heating/cooling need (i.e., a substantial heating/cooling load) with current setpoint ranges. If there is not a substantial heating/cooling load, setpoint adjustment controller 604 can adjust the setpoint boundaries accordingly such that additional heating/cooling is provided to the space. In this case, setpoint adjustment controller 604 can monitor the setpoint range and potentially adjust the setpoint range on an hourly or more granular basis as opposed to a daily or less granular basis.

User Override Enhancements

Referring still to FIGS. 9 and 10, setpoint adjustment controller 604 can be configured to allow a user to customize how MPC system 630 handles user overrides or occupant setpoint adjustments. In some embodiments, a separate algorithm is performed by setpoint adjustment controller 604 that functions as an MPC post-processor (e.g., running every 15 minutes) and requires a day of historical data along with predicted MPC results. This separate algorithm can allow a user to customize how MPC system 630 handles occupant setpoint adjustments, thereby providing additional flexibility. The input data used by the MPC post-processor for each zone 607 in a zone group can include a maximum occupant setpoint override persistence, MPC setpoints for the previous day plus one hour predicted, and an actual temperature setpoint over a previous day, according to some embodiments. In some embodiments, the default value of the maximum occupant setpoint override persistence is zero.

Setpoint adjustment controller 604 and/or MPC system 630 can check for occupant setpoint adjustments and persist them for as long as specified by the maximum occupant setpoint override persistence value. For each zone 607 in a zone group, setpoint adjustment controller 604 and/or MPC system 630 can determine if the actual setpoint is currently different then the MPC setpoint, which implies that the occupant has adjusted the setpoint, according to some embodiments. Setpoint adjustment controller 604 and/or MPC system 630 then computes a duration that the setpoint has been overridden, according to some embodiments. If the duration is less than the maximum occupant setpoint override persistence value, setpoint adjustment controller 604 and/or MPC system 630 then overrides the setpoint to the previous occupant dictated setpoint, according to some embodiments. If the duration is not less than the maximum occupant setpoint override persistence value, setpoint adjustment controller 604 and/or MPC system 630 maintains the current MPC setpoint, according to some embodiments. The the setpoint can then be used by setpoint adjustment controller 604 and provided to building equipment 612 (e.g., a VRF indoor unit).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An HVAC system for automatically adjusting setpoint boundaries of a space, the system comprising:
   building equipment configured to provide heating or cooling to the space to affect an environmental condition of the space; and
   a setpoint adjustment controller configured to:
      obtain occupant setpoint adjustment data indicating occupant setpoint increases or occupant setpoint decreases at a plurality of times during a time interval;
      partition the occupant setpoint adjustment data into a plurality of time period bins based on the plurality of times associated with the occupant setpoint adjustment data, each of the time period bins containing occupant setpoint adjustment data characterized by a common time attribute;
      determine a number of occupant setpoint increases and a number of occupant setpoint decreases indicated by the occupant setpoint adjustment data within each time period bin; and
      adjust a setpoint boundary of the space based on the number of occupant setpoint increases or the number of occupant setpoint decreases.

2. The system of claim 1, wherein each of the plurality of time period bins corresponds to a particular day type and a particular daily time period and the controller is configured to adjust a setpoint boundary of a particular day type and a particular daily time period based on the number of occupant setpoint increases and occupant setpoint decreases indicated by the occupant setpoint adjustment data within the corresponding time period bin.

3. The system of claim 1, wherein the controller is configured to:
   increase the setpoint boundary of the space for one or more time periods associated with a first particular time period bin in response to the number of setpoint increases indicated by the occupant setpoint adjustment data within the first particular time period bin exceeding a predetermined threshold value; and
   decrease the setpoint boundary of the space for one or more time periods associated with a second particular time period bin in response to the number of setpoint decreases indicated by the occupant setpoint adjustment data within the second particular time period bin exceeding the predetermined threshold value.

4. The system of claim 1, wherein the controller is configured to maintain a current setpoint boundary for one or more time periods associated with a particular time period bin in response to:
   the number of setpoint decreases indicated by the occupant setpoint adjustment data within the particular time period bin being equal to the number of setpoint increases indicated by the occupant setpoint adjustment data within the particular time period bin; or
   both (1) the number of setpoint decreases indicated by the occupant setpoint adjustment data within the particular time period bin being less than a first threshold value and (2) the number of setpoint increases indicated by the occupant setpoint adjustment data within the particular time period bin being less than a second threshold value.

5. The system of claim 1, wherein the controller is configured to increase or decrease the setpoint boundary of the space a predetermined amount to adjust the setpoint boundary.

6. The system of claim 1, wherein the controller is configured to independently adjust a minimum allowable setpoint boundary of the space and a maximum allowable setpoint boundary of the setpoint boundary of the space based on the number of setpoint increases and the number of setpoint decreases indicated by the occupant setpoint adjustment data.

7. The system of claim 1, wherein the controller is configured to:
   determine if the occupant setpoint adjustment data does not indicate occupant discomfort by:
      if the building equipment is in a cooling mode:
         determining if a zone temperature at an occupant setpoint adjustment time exceeds a model predictive setpoint at the occupant setpoint adjustment time by at least a first predetermined amount;
         determining if the model predictive setpoint at the occupant setpoint adjustment time exceeds a setpoint at the occupant setpoint adjustment time; and
         determining that the occupant setpoint adjustment data does not indicate occupant discomfort in response to both (1) the zone temperature exceeding the model predictive setpoint by at least the first predetermined amount and (2) the model predictive setpoint exceeding the setpoint at the occupant setpoint adjustment time;
      if the building equipment is in a heating mode:
         determining if the zone temperature at the occupant setpoint adjustment time is less than the model predictive setpoint at the occupant setpoint adjustment time by at least a second predetermined amount;
         determining if the model predictive setpoint at the occupant setpoint adjustment time is less than the setpoint at the occupant setpoint adjustment time; and
         determining that the occupant setpoint adjustment data does not indicate occupant discomfort in response to both (1) the zone temperature being less than the model predictive setpoint by at least the second predetermined amount and (2) the model predictive setpoint being less than the setpoint at the occupant setpoint adjustment time; and
   remove occupant setpoint adjustment data that does not indicate occupant discomfort to generate filtered occupant setpoint adjustment data.

8. A method for adjusting temperature setpoint boundaries to maintain occupant comfort, the method comprising:
   obtaining occupant setpoint adjustment data indicating occupant setpoint increases or occupant decreases at a plurality of times during a time interval;
   partitioning the occupant setpoint adjustment data into a plurality of time period bins based on the plurality of times associated with the occupant setpoint adjustment data, each of the time period bins containing occupant setpoint adjustment data characterized by a common time attribute;
   counting, for each time period bin:
      a number of occupant setpoint increases; and
      a number of occupant setpoint decreases;
   determining, for each time period bin:
      if the number of occupant setpoint increases exceeds a first threshold value; and
      if the number of occupant setpoint decreases exceeds a second threshold value; and
   adjusting a setpoint boundary of one or more time period bins based on if the number of occupant setpoint increases exceeds the first threshold value or if the number of occupant setpoint decreases exceeds the second threshold value.

9. The method of claim 8, wherein partitioning the occupant setpoint adjustment data comprises partitioning the occupant setpoint adjustment data by day type and into a plurality of time period bins for each day type.

10. The method of claim 8, further comprising operating building equipment to affect an environmental condition of a space based on the adjusted setpoint boundary.

11. The method of claim 8, further comprising:
   increasing the setpoint boundary in response to the number of occupant setpoint increases exceeding the first threshold value;
   decreasing the setpoint boundary in response to the number of occupant setpoint decreases exceeding the second threshold value; and
   maintaining a current setpoint boundary in response to the number of occupant setpoint increases being equal to the number of setpoint increases or both (1) the number of occupant setpoint increases being less than the first threshold value, and (2) the number of setpoint decreases being less than the second threshold value.

12. The method of claim 11, further comprising:
   increasing the setpoint boundary in response to:
      the number of occupant setpoint increases exceeding the first threshold value;
      the number of occupant setpoint decreases exceeding the second threshold value; and
      the number of occupant setpoint increases exceeding the number of occupant setpoint decreases; and
   decreasing the setpoint boundary in response to:
      the number of occupant setpoint increases exceeding the first threshold value;
      the number of occupant setpoint decreases exceeding the second threshold value; and
      the number of occupant setpoint decreases exceeding the number of occupant setpoint increases.

13. The method of claim 8, wherein increasing the setpoint boundary comprises increasing a minimum boundary and a maximum boundary by a predetermined offset amount, and decreasing the setpoint boundary comprises decreasing the minimum boundary and the maximum boundary by a predetermined offset amount.

14. A method for adjusting a temperature setpoint boundary to maintain occupant comfort, the method comprising:
   obtaining occupant setpoint data for a time duration;
   partitioning the occupant setpoint data into a plurality of time period bins based on a plurality of times associated with the occupant setpoint data, each of the time period bins containing occupant setpoint data characterized by a common time attribute;
   counting, for each time period bins:
      a number of occupant setpoint increases; and
      a number of occupant setpoint decreases;
   determining if the number of occupant setpoint increases or the number of occupant setpoint decreases exceed a threshold value for each of the plurality of time period bins; and
   adjusting a minimum and maximum threshold of the temperature setpoint boundary for each of the plurality of time period bins that the number of occupant setpoint increases or the number of occupant setpoint decreases exceed the threshold value.

15. The method of claim 14, further comprising:
   increasing one of the minimum and the maximum thresholds for each of the time period bins that the number of occupant setpoint increases exceeds the threshold value; and decreasing one of the minimum and the maximum thresholds for each of the time period bins that the number of occupant setpoint decreases exceeds the threshold value.

16. The method of claim 14, further comprising adjusting the minimum and maximum thresholds of all time period bins associated with a particular one of the time period bins in response to the number of occupant setpoint increases or occupant setpoint decreases exceeding the threshold value for the particular one of the time period bins.

17. The method of claim 14, further comprising:
receiving a minimum model predictive setpoint boundary and a maximum model predictive setpoint boundary;
determining, for each of the time period bins:
  if the minimum threshold exceeds the minimum model predictive setpoint boundary; and
  if the maximum threshold is less than the maximum model predictive setpoint boundary;
in response to the minimum threshold exceeding the minimum model predictive setpoint boundary:
  increasing the minimum model predictive setpoint boundary to be equal to the minimum threshold; and
  increasing the maximum model predictive setpoint boundary to be equal to a smaller of (1) the maximum model predictive setpoint boundary plus an amount the minimum model predictive setpoint boundary is increased by to equal the minimum threshold, or (2) the maximum threshold; and
in response to the maximum threshold being less than the minimum model predictive setpoint boundary:
  decreasing the maximum model predictive setpoint boundary to be equal to be equal to the maximum threshold; and
  decreasing the minimum model predictive setpoint boundary to be equal to a larger of (1) the minimum model predictive setpoint boundary plus an amount the maximum model predictive setpoint boundary is decreased by to equal the maximum threshold, or (2) the minimum threshold.

18. The method of claim 17, further comprising maintaining current values of the minimum and maximum thresholds and current values of the minimum and maximum model predictive setpoint boundaries in response to both (1) the minimum threshold being less than the minimum model predictive setpoint boundary and (2) the maximum threshold being greater than the maximum model predictive setpoint boundary.

19. The method of claim 14, further comprising operating building equipment based on the temperature setpoint boundary to affect an environmental condition of a space.

20. The method of claim 19, further comprising removing occupant setpoint adjustments made during a transient time period of the building equipment.

* * * * *